United States Patent [19]
Oda et al.

[11] Patent Number: 5,983,856
[45] Date of Patent: Nov. 16, 1999

[54] INTAKE SYSTEM CONSTRUCTION FOR INTERNAL COMBUSTION ENGINE AND MANUFACTURING PROCESS OF INTAKE PASSAGE SECTION OF INTERNAL COMBUSTION ENGINE

[75] Inventors: Hideyuki Oda, Kyoto; Takashi Kawabe, Kyoto-fu; Nobuaki Murakami; Katsunori Ueda, both of Kyoto; Satoshi Yoshikawa, Otsu; Kenji Goto, Kyoto; Tomohiro Ohashi, Okazaki; Eiichi Hiruma, Kawasaki; Jyun Takemura, Toyota; Shigeo Yamamoto, Obu; Kazuyoshi Nakane, Okazaki, all of Japan

[73] Assignee: Mitsubishi Jidosha Kogyo Kabushiki Kaisha, Tokyo, Japan

[21] Appl. No.: 09/080,464

[22] Filed: May 19, 1998

Related U.S. Application Data

[62] Division of application No. 08/648,357, May 15, 1996, Pat. No. 5,836,284.

[30] Foreign Application Priority Data

May 15, 1995 [JP] Japan ................................ 7-116159
Sep. 11, 1995 [JP] Japan ................................ 7-233130

[51] Int. Cl.$^6$ .................................................... F02M 3/00
[52] U.S. Cl. ........................................ 123/308; 123/188.14
[58] Field of Search ................................ 123/306, 308, 123/188.14

[56] References Cited

U.S. PATENT DOCUMENTS

| | | |
|---|---|---|
| 4,805,569 | 2/1989 | Suzumura et al. . |
| 4,838,219 | 6/1989 | Fueling ............................... 123/188.14 |
| 5,195,488 | 3/1993 | Rattigan . |
| 5,265,568 | 11/1993 | Nakagawa ........................... 123/188.14 |
| 5,305,720 | 4/1994 | Ando et al. .......................... 123/193.4 |
| 5,558,061 | 9/1996 | Suminiski . |
| 5,605,123 | 2/1997 | Ohmura et al. . |
| 5,662,079 | 9/1997 | Snider ................................. 123/188.14 |
| 5,762,042 | 6/1998 | Yoshikawa et al. ............... 123/188.14 |
| 5,816,210 | 10/1998 | Yamaguchi ......................... 123/188.14 |
| 5,836,284 | 11/1998 | Oda et al. ............................... 123/308 |

FOREIGN PATENT DOCUMENTS

| | | |
|---|---|---|
| 4012492 A1 | 10/1990 | Germany . |
| 4265449 A | 9/1992 | Japan . |
| 6146886 A | 5/1994 | Japan . |

*Primary Examiner*—John Kwon

[57] ABSTRACT

An intake system construction for an internal combustion engine includes a combustion chamber formed with upper and lower extremities thereof defined by a lower wall of a cylinder head and a top wall of a piston, an intake open end formed in the lower wall in opposition to the combustion chamber on one side of a reference plane which contains a central axis of the cylinder, an intake port formed in communication with the combustion chamber via the intake open end and extending upwardly from the intake open end so that a vertical swirl of inducted air is formed in the combustion chamber, an intake valve having a head portion for opening or closing the intake open end and a stem portion extending from the head portion to an upstream side of the intake port through the cylinder head, and a straightening member arranged in the intake port on a downstream side of the stem portion so that an inducted air flow is straightened on the downstream side of the stem portion.

15 Claims, 16 Drawing Sheets

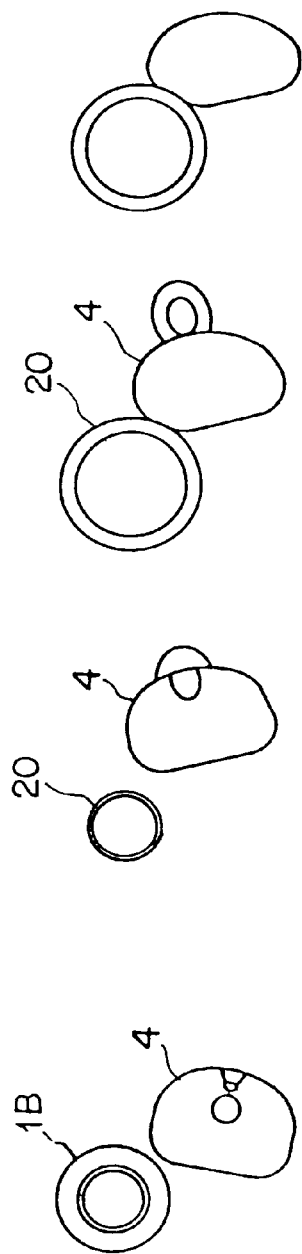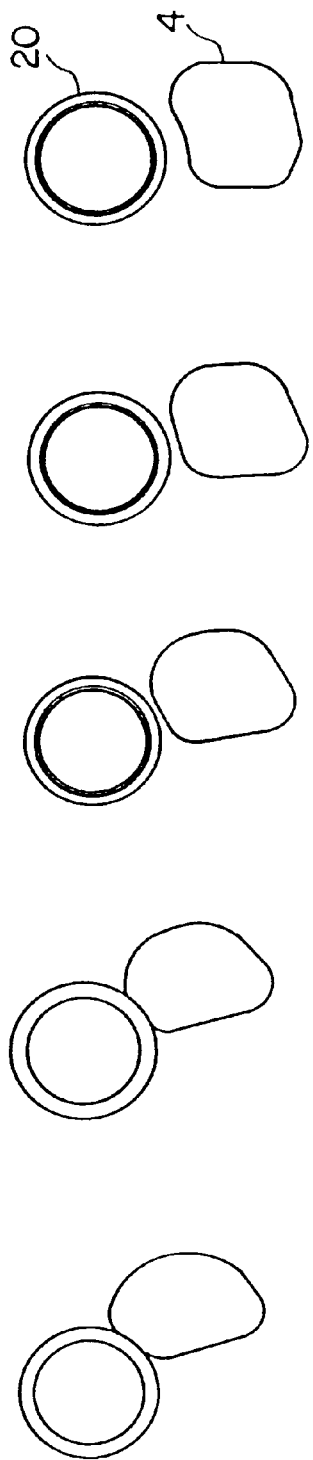

INTAKE SYSTEM CONSTRUCTION FOR INTERNAL COMBUSTION ENGINE AND MANUFACTURING PROCESS OF INTAKE PASSAGE SECTION OF INTERNAL COMBUSTION ENGINE

This application is a divisional of application Ser. No. 08/648,357, filed on May 15, 1996, U.S. Pat. No. 5,836,284, the entire contents of which are hereby incorporated by reference.

BACKGROUND OF THE INVENTION a) Field of the Invention

This invention relates to an intake system construction for an internal combustion engine and a manufacturing process of an intake passage section of an internal combustion engine. These intake system construction and manufacturing process are suited especially for application to a stratified burning internal combustion engine.

b) Description of the Related Art

In the field of developments of internal combustion engines, research and development work have been conducted in recent years on so-called stratified burning internal combustion engines in each of which a vertical swirl, that is, a tumble flow is formed in a combustion chamber in an intake stroke to permit efficient combustion of fuel in a combustion chamber.

A description is now made about such a stratified burning internal combustion engine. This internal combustion engine is designed to efficiently perform combustion of fuel by forming a tumble flow in a cylinder in an intake stroke and maintaining the tumble flow to a later stage of a subsequent compression stroke, for example, as shown in FIG. 20.

FIG. 20 illustrates the construction of one cylinder of an internal combustion engine which has been designed to form tumble flows. In FIG. 20, there are depicted a cylinder 1A, a reciprocating piston (hereinafter referred to simply as the "piston") 2, a cylinder head 3, an intake port 4, an intake port open end 4A and a combustion chamber 7.

Described specifically, the combustion chamber 7 is formed between a top wall of the piston 2, which is fittedly inserted in the cylinder 1A, and a lower wall of the cylinder head 3. The intake port open end 4A is formed in the cylinder head 3 so that the intake port 4 opens to the combustion chamber 7 through the intake port open end 4A.

In diesel internal combustion engines, which primarily use diesel fuel or the like, it has been the practice to directly inject fuel into a combustion chamber and then to cause it to undergo autoignition by compressed air in the combustion chamber so that power is obtained.

In the meantime, a variety of in-cylinder injection gasoline engines of the type that fuel is directly injected into each combustion chamber to improve the responsibility of the engines have also been proposed.

A brief description will now be made about the specific construction of such an in-cylinder injection gasoline engine. For the in-cylinder injection gasoline engine, a spark plug is needed as ignition means. This spark plug is arranged in a combustion chamber. Further, an injector is disposed in a cylinder head, for example, on a side of an intake valve.

In such an in-cylinder injection internal combustion engine, it is also desired to improve the gas mileage of the engine by forming an eddy-like flow of inducted air in the combustion chamber and performing lean burn with fuel leaner than a stoichiometric air-fuel mixture.

A construction has therefore been proposed with a view to forming such an eddy-like flow of inducted air. According to this construction, an inducted air flow from the intake port is introduced in a direction as parallel as possible with a lower wall of the cylinder head and is then caused to advance downwardly along an inner peripheral wall of the cylinder so that an eddy-like inducted air flow is formed.

However, to form an eddy-like inducted air flow by using such a construction, it is necessary to arrange the intake port in a direction as parallel as possible with the lower wall of the cylinder head. In an in-cylinder injection internal combustion engine, no sufficient space is therefore retained for the arrangement of an injector.

It was hence contemplated—like the technique disclosed, for example, in Japanese Patent Application Laid-open (Kokai) No. HEI 6-146886—to form a strong vertical swirl (tumble flow) in a combustion chamber so that an engine can be stably operated even in a lean burn mode.

Such a technique is however rather insufficient for the formation of a vertical swirl of a high tumbling degree because an intake port is bent toward a center axis of an associated cylinder.

To cope with the above problem, a construction has been proposed as shown in FIG. 20, that is, an intake port is bent (or inclined) in a direction away from a central axis of an associated cylinder so that a vertical swirl of such a high tumbling degree as described above can be surely formed.

Even with the technique proposed immediately above, there is the problem that formation of a tumble flow of sufficient strength becomes difficult when the volume of the combustion engine increases to or beyond a certain value.

Namely, when the volume of the combustion chamber becomes large, a flow of intake air inducted into the cylinder becomes stronger. As illustrated in FIG. 20, upon entrance of the inducted air flow into a cylinder 1A from an intake port 4, the inducted air flow strikes a head portion 61a of an intake valve 61 so that the inducted air flow is bifurcated to both sides of the head portion 61a. Accordingly, the intake valve 61 itself becomes an induction resistance and hence acts as an adverse factor upon formation of a vertical swirl in the cylinder 1A.

In such a stratified burning internal combustion engine, it is desired to feed an inducted air flow from the intake port 4 into the combustion chamber 7 under minimized disturbance so that formation of the inducted air flow into a stratified tumble flow can be facilitated.

Incidentally, the intake port 4 is internally provided with the intake valve 61. A portion of an inducted air flow may therefore strike the stem portion 61b so that the inducted air flow may be disturbed. Specifically, when a portion of an inducted air flow strikes the stem portion 61b, vortices tend to occur in a flow behind the stem portion 61b, thereby forming a region where inducted air flows at a lower velocity.

The flow velocity is therefore lowered behind the stem portion 61b and a substantial loss takes place in the flow. This leads to the inconvenience that formation of a strong tumble flow in the combustion chamber 7 may be prevented. To form a strong tumble flow or, speaking in a still broader sense, not only to form a strong tumble flow but also to improve the efficiency of induction of air, it is required to suppress the occurrence of a disturbance to an inducted air flow by the stem portion 61b.

Integral formation of means as a raised portion extending into a flow passage from an inner peripheral wall of the intake port 4 for the suppression of the occurrence of a disturbance to an inducted air flow, however, involves the potential problem that configurational variations may take place upon casting, possibly resulting in occurrence of differences in the efficiency of air induction among individual intake ports.

Further, an intake port generally has a complex internal configuration. It is therefore not easy to form, in such an intake port, a raised portion in dimensions as preset. The formation of such a raised portion also involves the problem that greater man-hour hours of labor are needed.

SUMMARY OF THE INVENTION

The present invention has been completed with the foregoing problems in view. An object of the present invention is therefore to provide an intake system construction for an internal combustion engine, which significantly reduces an induction resistance of an intake valve, allows an inducted air flow to smoothly flow into a cylinder and enables to form a vertical swirl of sufficient strength, and also to provide a process for the manufacture of an intake passage section of an internal combustion engine. Another object of the present invention is to provide an intake system construction for an internal combustion engine, which can be manufactured easily and can effectively straighten an inducted air flow, and a manufacturing process therefor.

In one aspect of the present invention, there is thus provided an intake system construction for an internal combustion engine, comprising:

- a combustion chamber formed with upper and lower extremities thereof defined by a lower wall of a cylinder head and a top wall of a piston fittedly inserted in a cylinder;
- an intake open end formed in said lower wall of said cylinder head in opposition to said combustion chamber on one side of a reference plane which contains a central axis of said cylinder, said intake open end being opened or closed by an intake valve;
- an exhaust open end formed in said lower wall of said cylinder head in opposition to said combustion chamber on an opposite side of said reference plane, said exhaust open end being opened or closed by an exhaust valve;
- an intake port formed in communication with said combustion chamber via said intake open end and extending upwardly from said intake open end so that a vertical swirl of inducted air is formed in said combustion chamber; and
- an exhaust port communicating with said combustion chamber via said exhaust open end so that combustion gas is discharged from said combustion chamber;
- wherein said intake port is formed wider in one of halves thereof located adjacent said reference plane than in the other half thereof located remote from said reference plane, whereby a central axis of an inducted air flow in said intake port is off-centered toward said reference plane; and
- said intake port is provided at a lower extremity thereof in said one half thereof with a guide portion for guiding an inducted air flow in said intake port toward an inner peripheral surface of a side wall of said cylinder in said combustion chamber.

The intake port may preferably define a passage of a cross-sectional shape that at said lower extremity of said intake port, said one half located adjacent said reference plane is formed with a cross-sectional area wider than said the other half located remote from said reference plane.

The intake port may preferably define a passage of a cross-sectional shape which, at said lower extremity of said intake port, is in a substantially semicircular form having a chord on a side of said reference plane or which, at said lower extremity of said intake port, is in a substantially triangular form having a side on a side of said reference plane.

At said lower extremity of said intake portion, the degree of projection of said guide portion from an inner wall of said intake port may be set to gradually increase toward said intake open end.

The internal combustion engine may preferably be constructed as an in-cylinder injection internal combustion engine with a fuel injection valve arranged so that fuel is directly injected into said combustion chamber.

According to the construction as described above, it is possible to bring about the advantage that an induction resistance to an inducted air flow upon entrance of the inducted air flow into the combustion chamber can be substantially reduced and a strong vertical swirl can be formed in the combustion chamber. Even in the case of an engine whose combustion chamber has a relatively large volume, a sufficient vertical swirl can be formed, leading to the advantage that a state of stable combustion can be obtained even with fuel leaner than a stoichiometric air/fuel ratio. Further, the above construction has the advantage that in an inducted air flow in the intake port, a flow in the base-plane-side half of intake port can be surely strengthened.

In another aspect of the present invention, there is also provided an intake system construction for an internal combustion engine, comprising:

- a combustion chamber formed with upper and lower extremities thereof defined by a lower wall of a cylinder head and a top wall of a piston fittedly inserted in a cylinder;
- an intake open end formed in said lower wall of said cylinder head in opposition to said combustion chamber on one side of a reference plane which contains a central axis of said cylinder;
- an intake port formed in communication with said combustion chamber via said intake open end and extending upwardly from said intake open end so that a vertical swirl of inducted air is formed in said combustion chamber;
- an intake valve having a head portion for opening or closing said intake open end and a stem portion extending from said head portion to an upstream side of said intake port through said cylinder head;
- and exhaust valve for opening or closing an exhaust open end formed in said lower wall of said cylinder head in opposition to said combustion chamber on an opposite side of said reference plane;
- an exhaust port communicating with said combustion chamber via said exhaust open end so that combustion gas is discharged from said combustion chamber; and
- a straightening member arranged in said intake port on a downstream side of said stem portion so that an inducted air flow is straightened on said downstream side of said stem portion.

In the intake system construction according to the another aspect of the present invention, said intake port may be arranged extending in a vertical direction so that said intake port extends substantially along said central axis, may be arranged extending substantially in said vertical direction on said one side of said reference plane, or may be arranged extending substantially in said vertical direction and crossing said reference plane from said one side thereof to said the other side thereof.

The straightening member may preferably be constructed as a convex portion formed so that said convexity projects from an inner wall of said intake port toward a central part of said intake port.

The convex portion may preferably be arranged at a predetermined interval from said stem portion.

The intake system construction may further comprise a valve stem guide for slidably and rotatably guiding said stem portion relative to said cylinder head, and the valve stem guide may preferably be arranged in said cylinder head without being exposed in said intake port.

The internal combustion engine may preferably be constructed as an in-cylinder injection internal combustion engine with a fuel injection valve arranged so that fuel is directly injected into said combustion chamber.

According to the construction of the another aspect of the present invention, the straightening member is arranged on the downstream side of the stem portion in the intake port to straighten an inducted air flow in the vicinity of the stem portion. This has made it possible to suppress occurrence of disturbance in a flow behind the stem portion when an inducted air flow passes near the stem portion inside the intake port. Irrespective of the configuration of the intake port, a loss of the flow can be reduced, thereby making it possible to improve the efficiency of induction.

When it is desired to form a tumble flow in the cylinder by an inducted air flow, the straightening of the inducted air flow makes it possible to form a strong tumble flow in the cylinder (combustion chamber) and, for example, fuel injection in a compression stroke can perform a lean operation more surely while making use of the tumble flow. Subsequent to collapse of the tumble flow, a stronger disturbance can be developed. Positive use of this post-collapse disturbance can ensure atomization and mixing of fuel, thereby promoting combustion. This has the advantage that a stoichiometric operation can be performed more surely, for example, by fuel injection in an intake stroke.

Further, the stem portion is arranged so that the stem portion is inclined relative to the intake port toward one side of the intake port on an upstream side thereof. An axis of an inducted air flow which is passing inside the intake port is off-centered to one side of the central axis of the intake port. This has made it possible to form a stronger tumble flow in the combustion chamber. For example, fuel injection in a compression stroke can therefore perform a lean operation more surely while making use of the tumble flow. Subsequent to collapse of the tumble flow, a stronger disturbance can be developed. Positive use of this post-collapse disturbance can ensure atomization and mixing of fuel, thereby promoting combustion. This has the advantage that a stoichiometric operation can be performed more surely, for example, by fuel injection in an intake stroke.

Further, the intake port is arranged extending in a direction such that the intake port extends along the axis of the cylinder on one side of the reference plane in which the axis of the cylinder is contained. An outer area of the intake port is therefore left unoccupied, thereby making it possible to retain a sufficient space for the arrangement of an injector-mounting portion where an injector is mounted for the injection of fuel. An optimal layout can therefore be achieved for both the injector-mounting portion (including the injector itself) and a spark plug.

It is possible to effectively straighten an inducted air flow behind the stem portion by constructing the straightening member as a convex portion arranged extending from an inner wall of the intake port toward the downstream side of said stem portion or arranging the straightening member on the downstream side of the stem portion at a predetermined interval from the stem portion.

In a still further aspect of the present invention, there is also provided a process for the manufacture of an intake passage section of an internal combustion engine, comprising:

integrally forming a bulged portion, which bulges out from an inner wall of an intake port, on a downstream side of a stem portion of an intake valve in said intake port upon casting a cylinder head;

cutting said bulged portion at an upstream part thereof close to said stem portion concurrently with boring of a stem guide hole in which a valve stem guide for slidably and rotatably guiding said stem portion of said intake valve in said cylinder head; and cutting said bulged portion at a downstream part thereof concurrently with boring of an insertion hole for a valve seat, said insertion hole forming an intake open end in said cylinder head;

whereby said bulged portion is formed as a straightening member for straightening an inducted air flow on said downstream side of said stem portion of said intake valve.

In the above process, said bulged portion may be cut at said upstream part thereof substantially in parallel with the direction of an axis of said stem portion and, at the time of the boring of said insertion hole for said valve seat, said bulged portion may be cut at said downstream part thereof in a direction perpendicular to said axis of said stem portion.

According to the process of this invention for the manufacture of the intake passage section, an intake system construction of an internal combustion engine can be manufactured by simple steps such as those described above, thereby bringing about the advantage that the manufacturing cost can be reduced.

In a still further aspect of the present invention, there is also provided a process of the manufacture of an intake passage section of an internal combustion engine, comprising:

integrally forming a bulged portion, which bulges out from an inner wall of an intake port, on a downstream side of a stem portion of an intake valve in said intake port upon casting a cylinder head; and cutting said bulged portion at an upstream part thereof close to said stem portion and at a downstream part thereof concurrently with boring of an insertion hole for a valve seat, said insertion hole forming an intake open end of said cylinder head.

According to this process, an intake system construction of an internal combustion engine can be manufactured by still simpler steps, thereby bringing about the advantage that the manufacturing cost can also be reduced.

In a still further aspect of the present invention, an intake system construction for an internal combustion engine, comprising:

a combustion chamber formed with upper and lower extremities thereof defined by a lower wall of a cylinder head and a top wall of a piston fittedly inserted in a cylinder;

an intake open end formed in said lower wall of said cylinder head in opposition to said combustion chamber on one side of a reference plane which contains a central axis of said cylinder;

an intake port formed in communication with said combustion chamber via said intake open end and extending upwardly from said intake open end so that a vertical swirl of inducted air is formed in said combustion chamber;

an intake valve having a head portion for opening or closing said intake open end and a stem portion extending from said head portion to an upstream side of said intake port through said cylinder head;

and exhaust valve for opening or closing an exhaust open end formed in said lower wall of said cylinder head in opposition to said combustion chamber on an opposite side of said reference plane;

an exhaust port communicating with said combustion chamber via said exhaust open end so that combustion gas is discharged from said combustion chamber;

a guide portion formed at a lower extremity of said intake port in one of halves of said intake port, said one half being located adjacent said reference plane, for guiding an inducted air flow in said intake port toward an inner peripheral surface of a side wall of said cylinder in said combustion chamber; and an inducted-air-flow-correcting portion arranged at said lower extremity of said intake port on a side of said intake open end so that an induction resistance to an inducted air flow, which flows through said intake port and is guided into said combustion chamber, is reduced to form a vertical swirl with an increased tumbling degree in said combustion chamber.

In this case, said one half of said intake port, said one half being located adjacent said reference plane, may be formed broader than said the other half of said intake port, and said inducted-air-flow-correcting portion may be composed of a lower portion of said intake port so that said inducted air flow in said intake port is off-centered toward said reference plane. Further, said inducted-air-flow-correcting portion may be composed of a straightening member arranged in said intake port on a downstream side of said stem portion for straightening said inducted air flow on said downstream side of said stem portion.

In addition, said one half of said intake port, said one half being located adjacent said reference plane, may be formed broader than said the other half of said intake port, a straightening member may be arranged in said intake port on a downstream side of said stem portion for straightening said inducted air flow on said downstream side of said stem portion, and said inducted-air-flow-correcting portion may be composed of a lower portion of said intake port and said straightening member so that said inducted air flow in said intake port is off-centered toward said reference plane.

According to such a construction, an induction resistance to an inducted air flow upon entrance of the inducted air flow to the combustion chamber can be significantly reduced, thereby bringing about the advantage that a strong vertical swirl can be formed in the combustion chamber. Even in the case of an engine whose combustion chamber has a relatively large volume, a sufficient vertical swirl can be formed, leading to the advantage that a state of stable combustion can be obtained even with fuel leaner than a stoichiometric air/fuel ratio. Further, in an inducted air flow in the intake port, a flow in the base-plane-side half of intake port can be surely strengthened.

Moreover, this has made it possible to suppress occurrence of disturbance in a flow behind the stem portion when an inducted air flow passes near the stem portion inside the intake port. Irrespective of the configuration of the intake port, a loss of the flow can be reduced, thereby making it possible to improve the efficiency of induction.

BRIEF DESCRIPTION OF THE DRAWINGS

FIGS. 4A through 4I are cross-sectional views of one of the intake ports in the intake system construction according to the first embodiment of the present invention for the internal combustion engine and an associated spark plug, taken in the directions of arrows IVA—IVA to IVI—IVI of FIGS. 2 and 3, respectively;

DESCRIPTION OF THE PREFERRED EMBODIMENTS (a) Description of the First Embodiment The intake system construction according to the first embodiment of the present invention for the internal combustion engine will hereinafter be described with reference to FIGS. 1 to 8J.

Describing first the overall structure of the incylinder injection internal combustion engine, a cylinder head of this internal combustion engine is constructed as a cylinder head for a 4-valve internal combustion engine whose cylinders are each provided with two intake valves and two exhaust valves.

Figure 2:
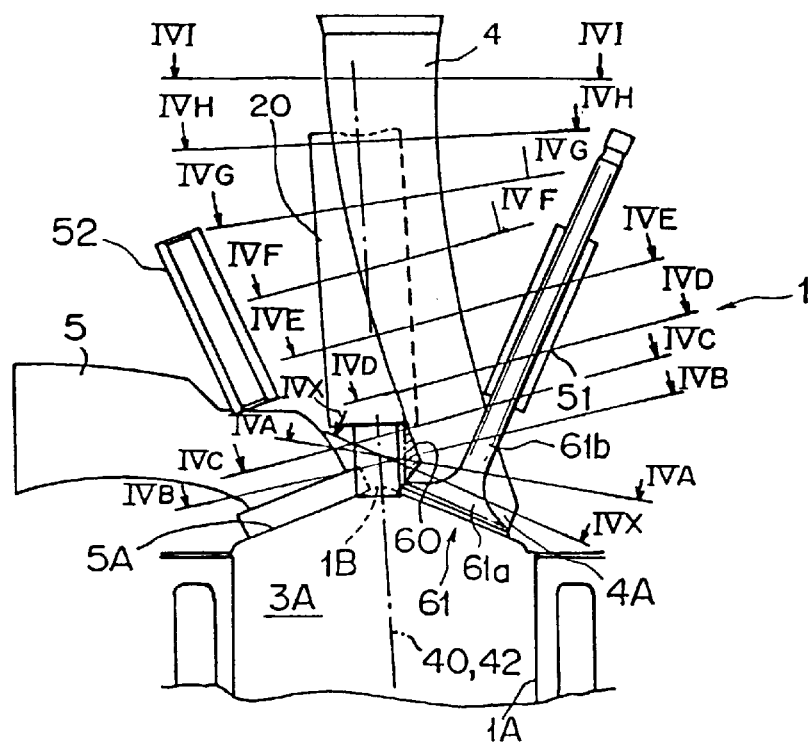
FIG. 2 is an overall view schematically illustrating an internal structure of the intake system construction according to the first embodiment of the present invention for the internal combustion engine.
Figure 3:
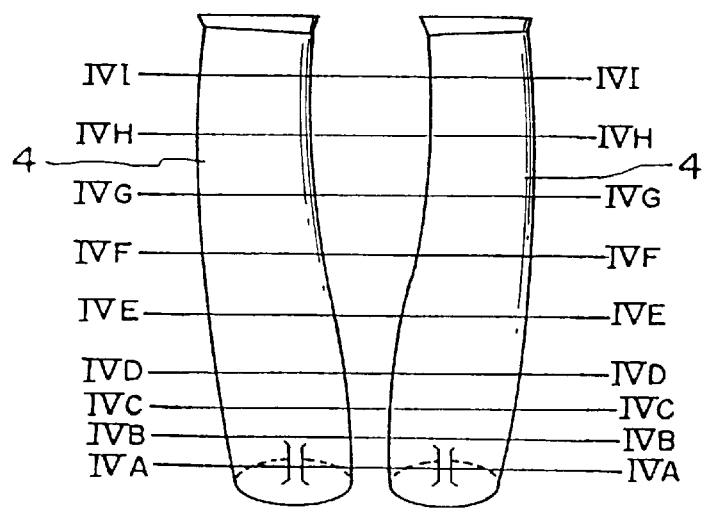
FIG. 3 is a front view showing intake ports in the intake system construction according to the first embodiment of the present invention for the internal combustion engine.
Figure 5:
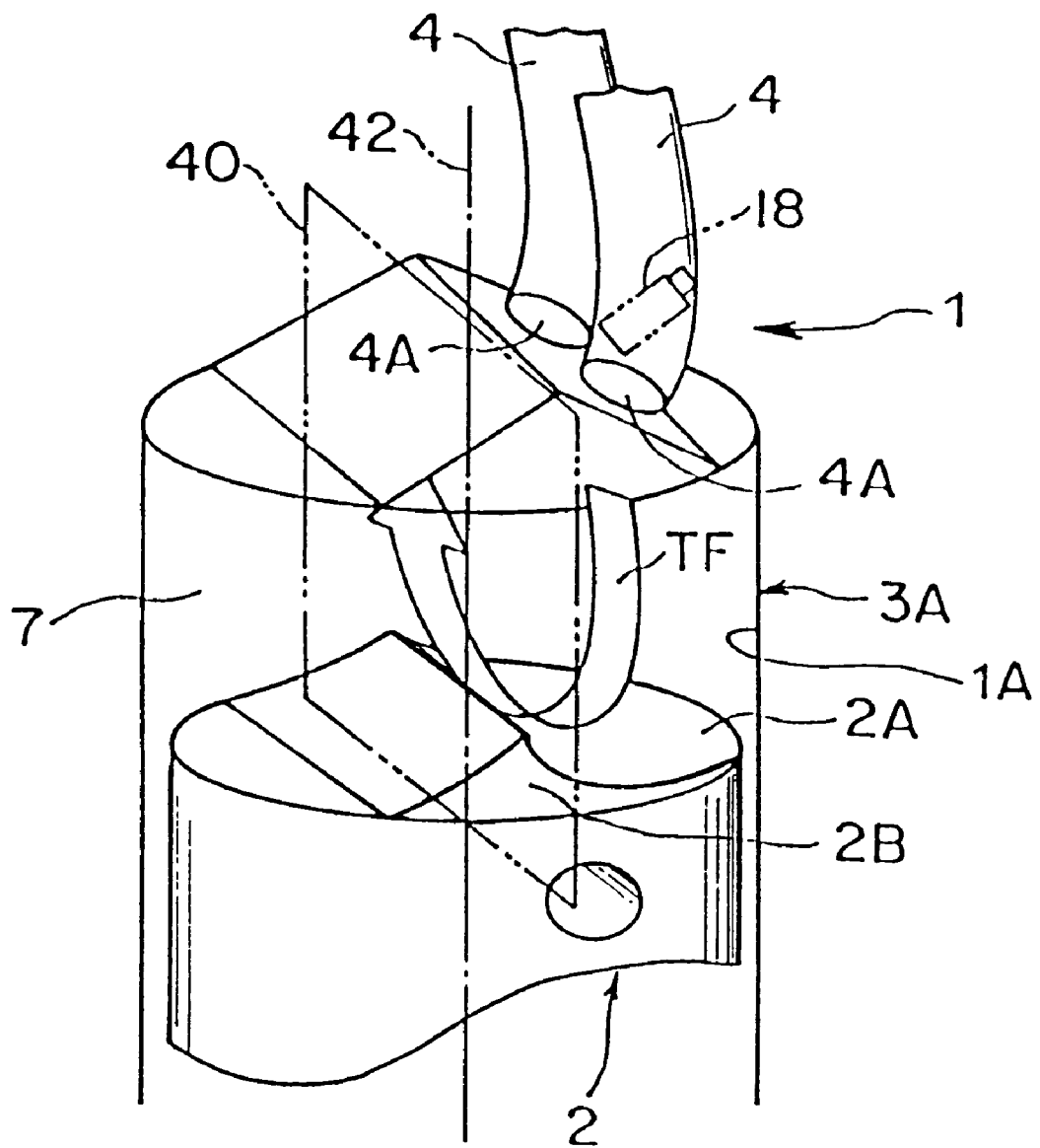
FIG. 5 is a schematic perspective view depicting an overall structure in the intake system construction according to the first embodiment of the present invention for the internal combustion engine.

As is depicted in FIGS. 2 and 5, a combustion chamber 7 is formed between a piston 2 and the cylinder head which is designated at numeral 1. In the cylinder head 1 of the combustion chamber 7, an intake port 4 and an exhaust port 5 are arranged. It is to be noted that only one intake port 4 is shown for the sake of simplicity in the drawings although each combustion chamber is provided with two intake ports. This applies equally to the exhaust port 5.

Further, an intake valve 61 and an exhaust valve (not shown) are disposed in open ends 4A,5A of these intake and exhaust ports 4,5 to the combustion chamber, respectively, whereby the open ends 4A,5A can be opened or closed by these intake and exhaust valves. In addition, designated at numeral 51 in FIG. 2 is a valve stem guide for the intake valve 61.

As is illustrated in FIG. 5, the combustion chamber 7 is provided with two intake ports 4 on one side of a reference plane 40 which is an imaginary plane containing a central axis 42 of a cylinder 3A and a central axis of an unillustrated crankshaft. On the other side of the reference plane, two exhaust ports 5 (see FIG. 2) are arranged. As is depicted in FIG. 2, a spark plug 20 is also mounted via a plug-mounting hole 1B at or near a center of a top portion of the combustion chamber 7 (namely, in the reference plane 40).

Figure 1:
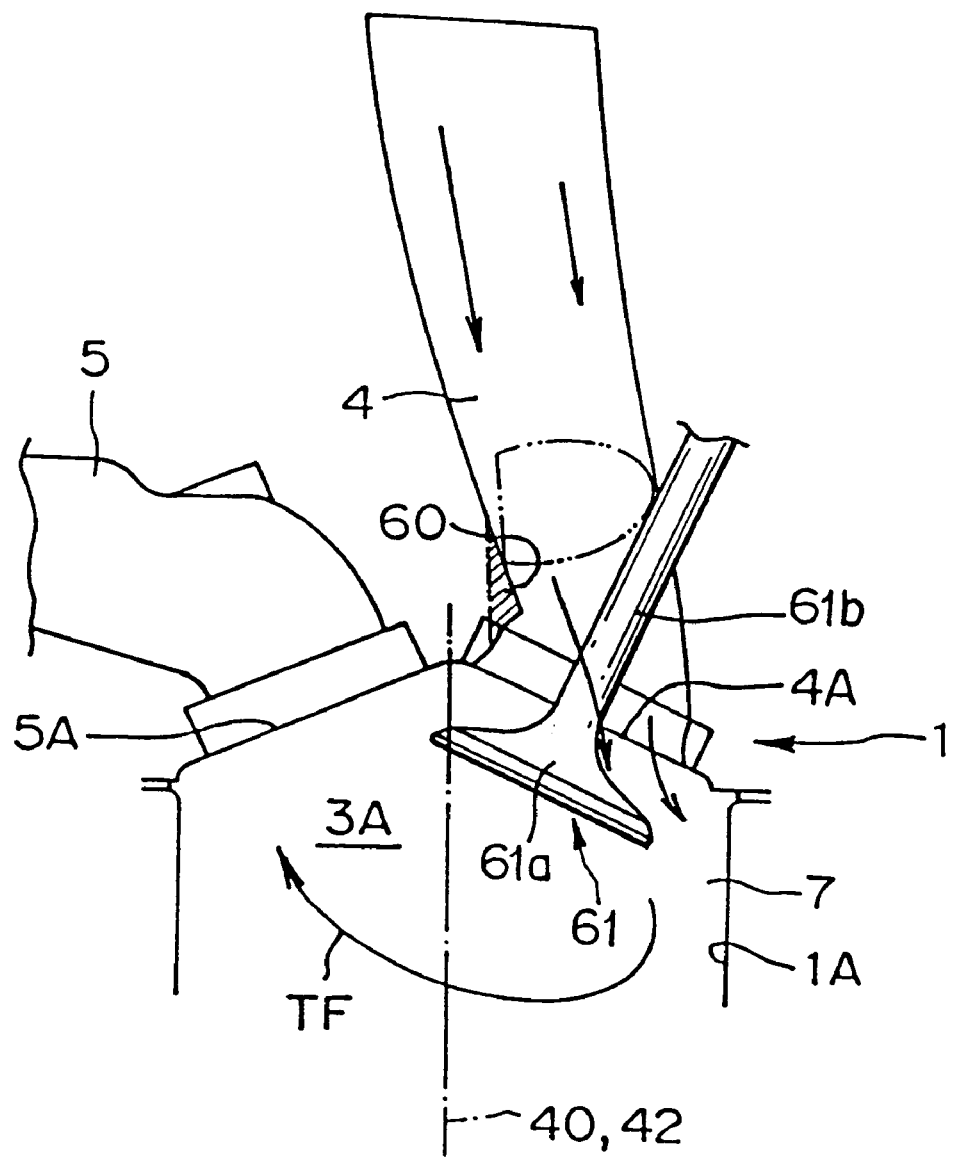
FIG. 1 is a schematic view for explaining a flow of inducted air with an emphasis placed on certain essential elements in an intake system construction according to a first embodiment of the present invention for an internal combustion engine.

As is shown in FIGS. 1 to 3 and 5, each intake port 4 is arranged so that it extends substantially upright from the cylinder head 1 and, as is depicted in FIGS. 1 and 2, is disposed in a position somewhat inclined relative to a mounting face of the cylinder head 1. Accordingly, an intake-valve-side upper portion of the combustion chamber 7 of the engine is in the form of a pentroof.

Figure 6:
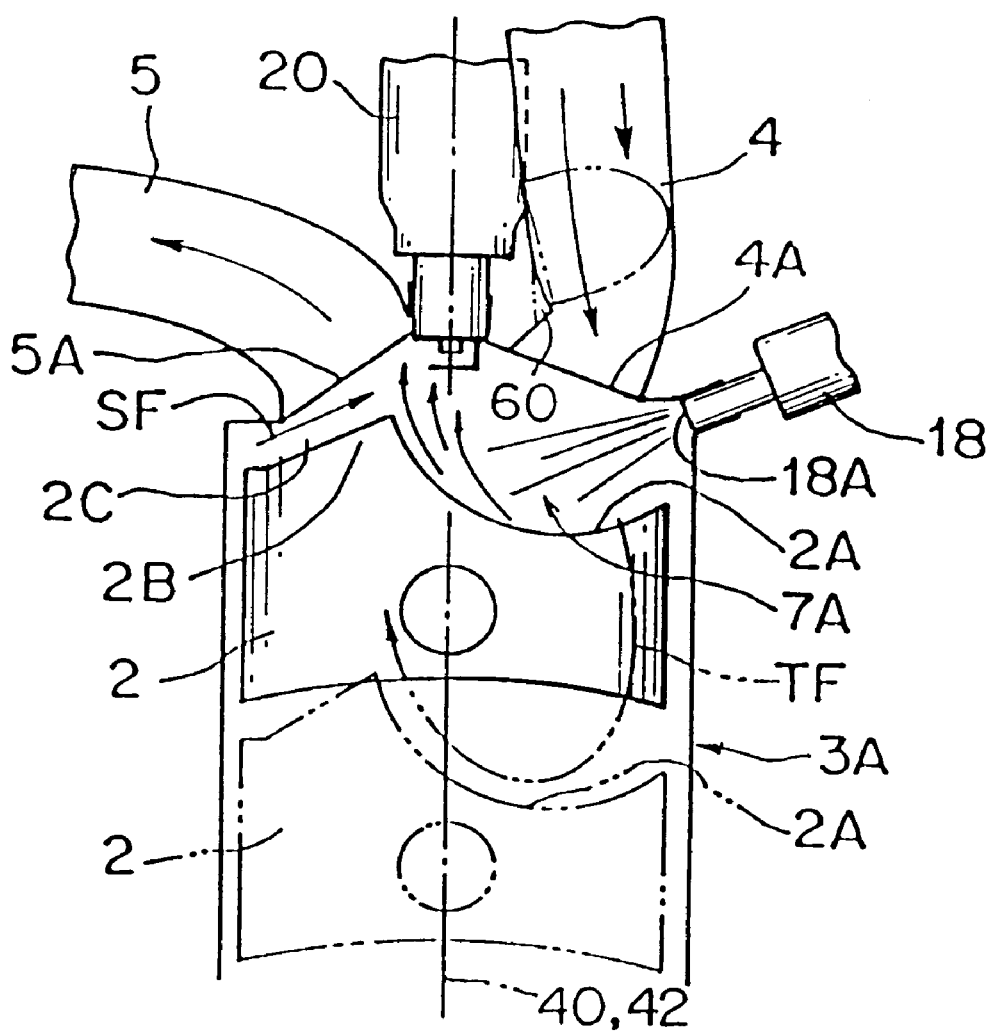
FIG. 6 is a schematic view for explaining an operation in the intake system construction according to the first embodiment of the present invention for the internal combustion engine.

Reference is next had to FIGS. 5 and 6. The cylinder head 1 is provided on a side of the intake ports 4 with an injector (fuel injection valve) 18 for feeding fuel into the combustion chamber 7. This injector 18 is arranged with an injection nozzle 18A, which is formed in a free end portion of the injector, facing the combustion chamber 7 so that fuel is injected directly into the combustion chamber 7.

Incidentally, this injector 18 is controlled, for example, by an unillustrated controller, whereby fuel can be injected in predetermined quantities at predetermined injection timings.

A description will now be made of a mounting portion for the injector 18. As the two intake ports 4 are arranged extending upwards in a substantially vertical direction from the cylinder head 1 as described above, a sufficient space can be retained around the open end 4A of the intake port 4 for mounting the injector 18. A large degree of freedom can be enjoyed upon setting the position of the injector 18 in relation to the spark plug 20, thereby making it possible to arrange the injector at a position optimal for the injection of fuel.

As has been described above, the piston 2 is fittedly inserted in the cylinder 3A. A recessed portion (curved portion) 2A is formed in a top portion of the piston 2 as illustrated in FIG. 5. This recessed portion 2A is arranged in the top portion of the piston 2 at an area located underneath the intake ports 4, and is formed by a downwardly convex, curved surface. Namely, this recessed portion 2A is arranged at a position off-centered from the reference plane 40 toward the intake ports 4 and, for example, is configured into a downwardly convex, curved, spherical shape.

On a side located underneath the exhaust ports 5, the top portion of the piston 2 is formed into an exhaust-valve-side top wall 2B which is located adjacent the recessed portion 2A and is located at a level higher than the recessed portion 2A. This exhaust-valve-side top wall 2B is connected to the recessed portion 2A.

It is therefore designed that, as shown in FIG. 6, a compact combustion chamber 7A is defined in a form surrounded by the recessed portion 2A of the piston 2, an inner wall 1A of the cylinder and the cylinder head 1 when the piston 2 has reached its position corresponding to the completion of a compression stroke.

A description is now made of certain essential elements of the present invention. In this in-cylinder direct injection internal combustion engine, each intake port 4 is formed to have a substantially semicircular cross-section at a part thereof as depicted in FIGS. 1 and 4A.

The intake port 4 which has the substantially semicircular cross-section, in other words, a substantially triangular cross-section is configured so that, as is shown in FIGS. 4A through 4I, it has a shape different from a semicircular shape on an upstream side but becomes substantially semicircular as it approaches a downstream-side end thereof. Further, the cross-sectional shapes shown in FIGS. 4A to 4I are configured so that they are smoothly connected together to avoid any substantial interference with a flow of inducted air.

Further, the intake port 4 is configured to have a substantially semicircular shape in the vicinity of the open end 4A of the intake port 4 as is shown in FIG. 4A. This semicircular shape is formed in such a way that one of halves of a transverse cross-section of the intake port 4, said one half being located on a side of the reference plane, is wider than the other half. Described specifically, the intake port 4 is formed so that a straight portion (i.e., broadened portion) of the semi-circular shape lies on a side of the central axis 42 (see FIG. 5) of the cylinder 3A and a circular arc portion of the semi-circular shape lies on a side of the side wall of the cylinder 3A.

On the other hand, as is depicted in FIGS. 1, 2 and 6, the intake port 4 is provided, in its half located on the side of the reference plane 40 and in the vicinity of the open end 4A of the intake port, with a raised portion 60 as a guide portion for smoothly guiding an inducted air flow, which has flowed through the intake port 4, from the open end 4A of the intake port toward the inner wall 1A of the cylinder. As is viewed in the direction that the reference plane 40 overlaps the central axis 42 of the cylinder and looks like a single line (namely, in the position of FIG. 1), the raised portion 60 is formed as a jumping hill somewhat warped toward the central axis 42 of the cylinder so that the inducted air flow is caused to concentrate in a direction away from the central axis 42 of the cylinder in the intake port 4.

Describing this raised portion 60 in further detail, the raised portion 60 is arranged so that in the vicinity of the open end 4A of the intake port 4, the inducted air flow in the intake port 4 is off-centered from the side of the central axis 42 of the cylinder toward the inner wall 1A of the cylinder.

Since the cross-section of the intake port 4 is formed in the vicinity of the open end 4A thereof into the semicircular shape broadened on the side of the central axis of the cylinder 3A as described above, a majority of the inducted air flow which has passed through the intake port 4 passes through the intake port 4 on the side of the central axis of the cylinder 3A (that is, through the half on the side of the reference plane 40).

Further, owing to the arrangement of the above-described raised portion 60 in the vicinity of the open end 4A of the intake port, the inducted air flow is guided by the raised portion 60 in the proximity of the open end 4A of the intake port so that the inducted air flow is off-centered from the side of the central axis 42 of the cylinder toward the inner wall 1A of the cylinder in the intake port 4.

The inducted air flow therefore advances toward the open end 4A of the intake port after it is deflected as described above. Upon opening of the intake valve 61, the inducted air flow is hence allowed to flow into the combustion chamber through the open end 4A of the intake port on the side of the inner wall 1A of the cylinder. The incident angle of the inducted air flow against the head portion 61a at the time of an intake therefore becomes acute so that the induction resistance at the valve head 62 is substantially reduced.

Further, the open end 4A of the intake port is arranged in the cylinder head of the pentroof form as described above, and the head portion 61a of the intake valve 61 is arranged so that the head portion 61a is located higher on the side of the central axis 42 of the cylinder. The incident angle of the inducted air flow against the head portion 61a therefore becomes more acute.

Accordingly, as is shown in FIG. 1, most of the inducted air flow in the intake port 4 smoothly enters between the head portion 61a of the intake valve 61 and the open end 4A of the intake port upon opening of the intake valve 61, thereby making it possible to such a situation that the inducted air flow is caused to de disturbed by directly striking the stem portion 61a of the intake valve 61.

Therefore, the inducted air flow is prevented from flowing into the combustion chamber through the open end 4A of the intake port on the side of the central axis 42 of the cylinder and instead, is allowed to strongly flow into combustion chamber 7 from a side closer to the inner wall 1A of the cylinder. It is therefore possible to form a strong swirl (tumble flow TF) in the clockwise direction, as viewed in FIG. 1, inside the cylinder 3A.

The recessed portion 2A of the piston 2 promotes the formation of the vertical swirl (tumble flow TF) is.

On the other hand, as is illustrated in FIG. 6, a squishing area 2C is formed between the exhaust-valve-side upper wall 2B of the top wall of the piston 2 and the exhaust-valve-side upper wall of the combustion chamber 7.

As is shown in FIGS. 2, 5 and 6, the inducted air flow which has flowed in through the intake port 4 therefore downwardly flows toward the piston 2, is guided along the recessed portion 2A of the piston 2, and then flows upwardly, whereby the tumble flow TF is formed. It is therefore designed that inside the combustion chamber 7, the inducted air flow advances along the recessed portion 2A and promotes the formation of the tumble flow TF.

Moreover, at this time, a flow which is advancing toward the spark plug 20 forms a squished flow SF by the squishing area 2C as shown in FIG. 6. This squished flow SF is guided by the exhaust-valve-side top wall 2B and the upper wall of the combustion chamber 7 and advances toward the center of the top portion of the combustion chamber 7. The squished flow SF and the tumble flow TF collide against each other so that an enhanced flow of an air-fuel mixture is formed.

As the intake system construction according to the first embodiment of the present invention for the internal combustion engine is formed as described above, an inducted air flow flows into the combustion chamber 7 through each intake port 4 and then through the open end 4A of the intake port 4 in an intake stroke of the engine.

Fuel is directly injected into the combustion chamber 7 through the injection nozzle 18A of the injector 18. Since the injector 18 is controlled by the unillustrated controller, the fuel is injected at an appropriate timing from the injector 18 and is mixed with the inducted air into an air-fuel mixture.

Because the intake port 4 is arranged substantially upright, the inducted air flow which has flowed into the combustion chamber 7 is allowed to advance downwardly (i.e., toward the piston 2) at this time.

Further, as is shown in FIG. 6, the cross-section of the intake port 4 is formed, in the vicinity of the open end 4A of the intake port, in the substantially semicircular shape broadened on the side of the central axis of the cylinder 3A. A majority of the inducted air flow which has advanced through the intake port 4 therefore passes through the intake port 4 on the side of the central axis of the cylinder 3A (i.e., through the base-plane-side half) in the vicinity of the open end 4A of the intake port.

Owing to the provision of the raised portion 60 in the vicinity of the open end 4A of the intake port, the inducted air flow is guided by the raised portion 60 in the proximity of the open end 4A of the intake port and is off-centered from the side of the central axis 42 of the cylinder toward the inner wall 1A of the cylinder inside the intake port 4.

Since the inducted air flow advances toward the open end 4A of the intake port after it has been deflected as described above, the incident angle of the inducted air flow against the head portion 61a becomes acute so that the induction resistance at the head portion 61a is substantially reduced.

Further, the cylinder head 1 is configured in the pentroof form and the head portion 61a of the intake valve 61 is arranged so that the head portion 61a is located higher on the side of the central axis 42 of the cylinder. The incident angle of the inducted air flow against the head portion 61a therefore becomes more acute.

This has made it possible to substantially reduce the induction resistance of the intake valve 61 and to permit strong introduction of the inducted air flow into the combustion chamber 7 from a side closer to the inner wall 1A of the cylinder.

On the other hand, the inducted air flow which has entered downwardly from an upper part of the combustion chamber 7 collides against the recessed portion 2A in the top wall of the piston 2 and then advances along the curved surface of the recessed portion 2A, so that its advancing direction is changed toward the upper portion of the combustion chamber 7.

The open end 4A of the intake port is arranged on one side of the cylinder head 1 relative to the reference plane 40, and the recessed portion 2A is arranged underneath the open end 4A in opposition to the open end 4A. The inducted air flow therefore advances to a portion of the recessed portion 2A, said portion being on the side of the inner wall 1A of the cylinder, and is then guided by the curved surface of the recessed portion 2A. The inducted air flow accordingly becomes an upward flow directed toward the center of the top wall of the cylinder 3A or its vicinity area, whereby the tumble flow TF is formed.

The inducted air flow is thereafter mixed in the combustion chamber 7 with the fuel injected through the injector 18. After being subjected to compression and expansion (explosion) in the combustion chamber 7, the resultant combustion gas is discharged through the exhaust port 5.

By forming one half of the substantially upright intake port 4, said one half being on the side of the reference plane 40, in the substantially semicircular shape broadened relative to the other half thereof and arranging the raised portion 60, which acts to off-center the inducted air flow toward the inner wall 1A of the cylinder, in the vicinity of the open end 4A of the intake port 4 as described above, the induction resistance—which is developed as a result of striking of the inducted air flow against the stem portion 61a of the intake valve when the inducted air flow enters the cylinder—can be substantially reduced so that the stronger tumble flow TF can be formed. This strong inducted air flow is therefore allowed to enter the cylinder 3A through the open end 4A of the intake port on the side remote from the central axis 43 of the cylinder (in other words, on the side of the inner wall 3A of the cylinder). When such a strong inducted air flow enters the cylinder 1A, the tumble flow TF is enhanced so that a sufficient tumble flow TF can be formed even in an engine whose combustion chambers have a large volume.

By forming the tumble flow TF as described above, the engine can be operated with an air-fuel mixture, which contains fuel at a ratio smaller than a stoichiometric air/fuel ratio, without deterioration in ignition performance.

Further, by this tumble flow TF, the air-fuel mixture is allowed to reach an area around the spark plug 20 arranged at the center of the top portion of the combustion chamber 7 while being fully stirred. The ignition performance can be improved, thereby making it possible to obtain a stable combustion state.

Owing to the substantially upright arrangement of the intake ports 4, a sufficient space is retained on the cylinder head 1 for mounting the injector 18. An increased degree of freedom can therefore be obtained for mounting the injector 18. This makes it possible to mount the injector 18 at a position suited for the direct injection of fuel into the combustion chamber 7.

Figure 7:
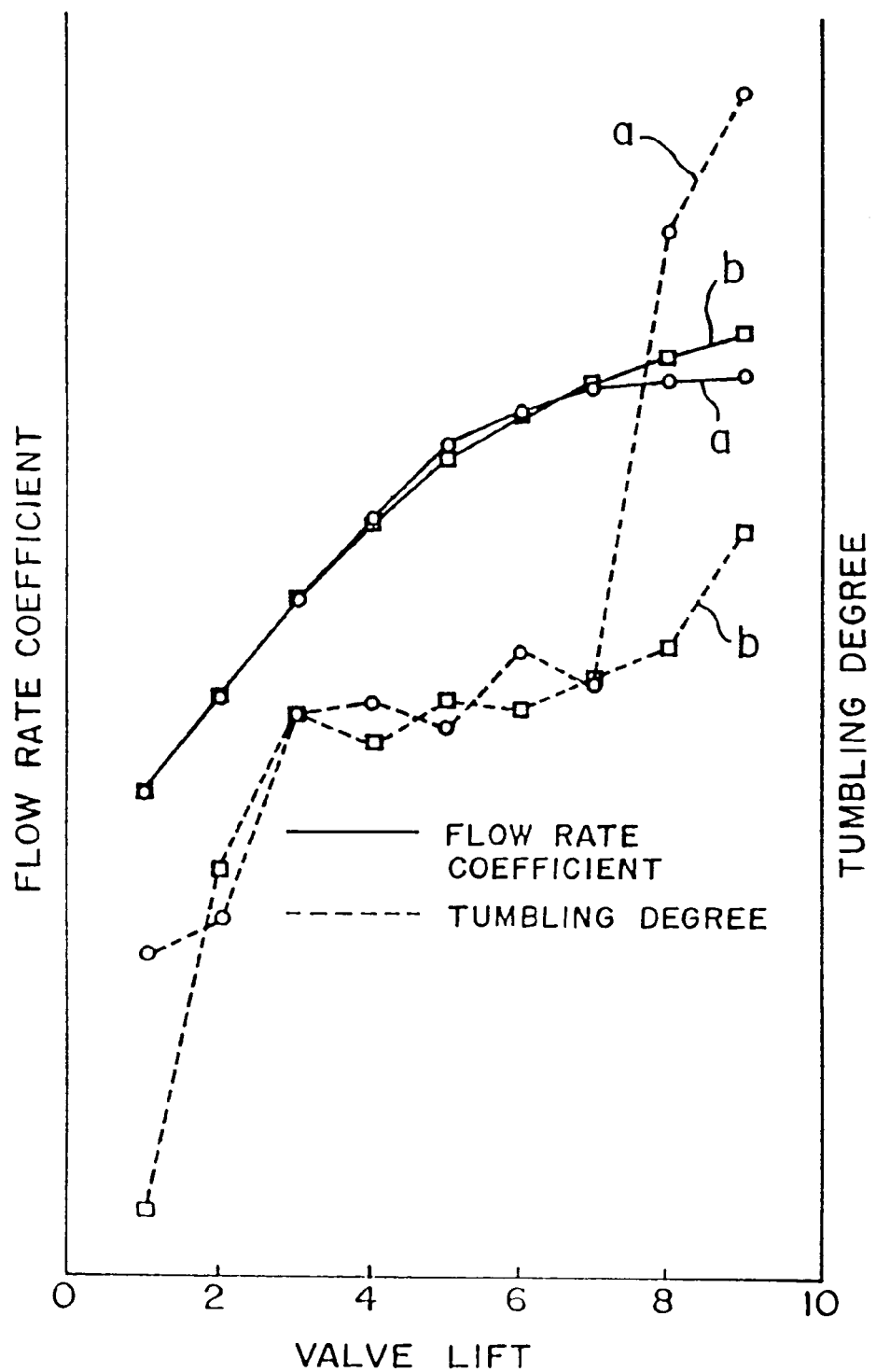
FIG. 7 is a diagram for explaining characteristics of the intake system construction according to the first embodiment of the present invention for the internal combustion engine.
Figure 8:
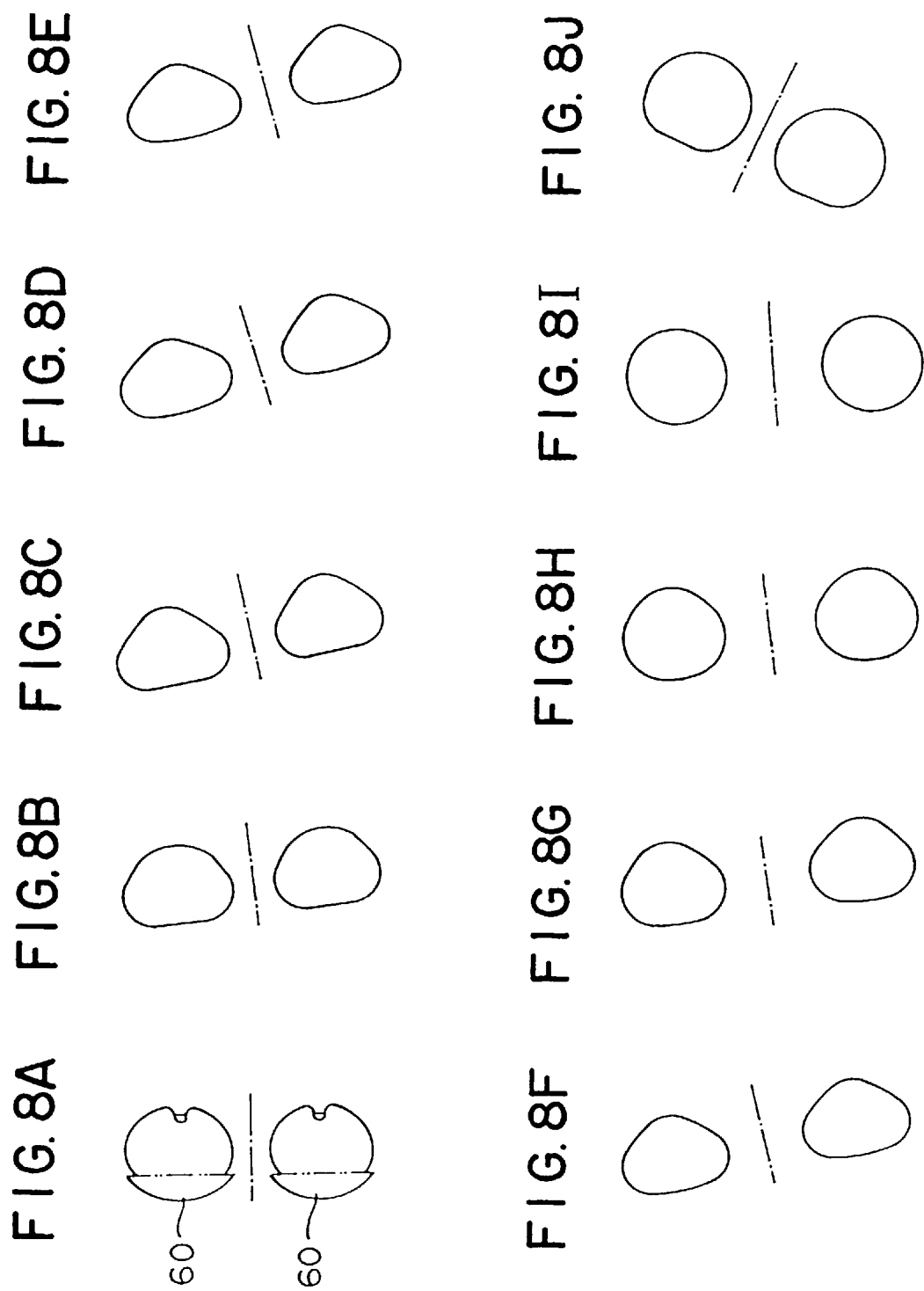
FIGS. 8A through 8J are similar to FIGS. 4A through FIG. 4I and illustrate a modification of the intake system construction according to the first embodiment of the present invention for the internal combustion engine.

Comparing the above in-cylinder injection internal combustion engine in flow rate coefficient and tumbling degree with a conventional one, characteristics are ascertained as shown in FIG. 7. In this diagram, lines a designate characteristics of the in-cylinder injection internal combustion engine according to the present invention whereas lines b indicate characteristics of the in-cylinder injection internal combustion engine having conventional intake ports.

As is shown in FIG. 7, the in-cylinder injection internal combustion engine according to the present invention is not substantially different in flow rate coefficient from the conventional one but has been considerably improved in tumbling degree over the conventional one. In particular, it is appreciated that this improvement in tumbling degree becomes prominent when the valve lift of the intake valve 61 is large.

A modification of the first embodiment of the present invention will be described next. In the incylinder injection internal combustion engine according to this modification, it is only the cross-sectional shape of each intake port that is different from the above-described embodiment, and the remaining elements are constructed as in the above-described embodiment.

In this modification, each intake port 4 is configured so that, as is illustrated in FIGS. 8A through 8J, the shape of its cross-section becomes closer to a substantially triangular shape as the point of the cross-section moves toward the downstream end of the intake port 4. Further, as is illustrated in FIGS. 8A though 8J, the intake port 4 is configured so that the individual cross-sectional shapes smoothly change to avoid any substantial interference with a flow of inducted air.

The triangular cross-section is formed so that like the above-described first embodiment, the intake port 4 is wider in one half thereof on the side of the reference plane 40 than in the other half thereof. Namely, the intake port is configured so that a bottom portion (widened portion) of the triangular cross-section is located on the side of the central axis of the cylinder 3A and the other half of a small cross-sectional area is located on the side of the side wall of the cylinder 3A.

The one half of the intake port 4, which is located on the side of the reference plane 40, is also provided in the vicinity of the open end 4A of the intake port 4 with the raised portion 60 which smoothly guides an inducted air flow, which has flowed in the intake port 4, from the open end 4A of the intake port toward the inner wall 1A of the cylinder. The raised portions 60 appear on a left-hand side in the cross-section shown in FIG. 8A.

By forming the cross-section of each intake port 4 into a substantially triangular shape as described above, this modification can also obtain similar action and effects as the above-described embodiment.

The cross-sectional shape of each intake port 4 is not limited to such a semicircular or triangular shape as described above, but may be configured into a different shape insofar as the intake port 4 is widened in the half thereof on the side of the reference plane 40 than in the other half thereof in the vicinity of the open end 4A of the intake port.

In the above-described first embodiment and modification thereof, the in-cylinder injection internal combustion engine was described as a 4-valve internal combustion engine equipped with two intake valves and two exhaust valves. It is however to be noted that the present invention is not limited to 4-valve internal combustion engines but can be applied, for example, to 3-valve internal combustion engines equipped with two intake valves and one exhaust valve and also to other internal combustion engines of various types.

Further, the detailed shape of the piston 2 is not limited to those of the above-described first embodiment and modification thereof. Other shapes may be employed insofar as a strong tumble flow TF can be formed in a compact combustion chamber.

(b) Description of the Second Embodiment

The intake system construction according to the second embodiment of the present invention for the internal combustion engine will next be described with reference to FIGS. 9 through 15.

Figure 9:
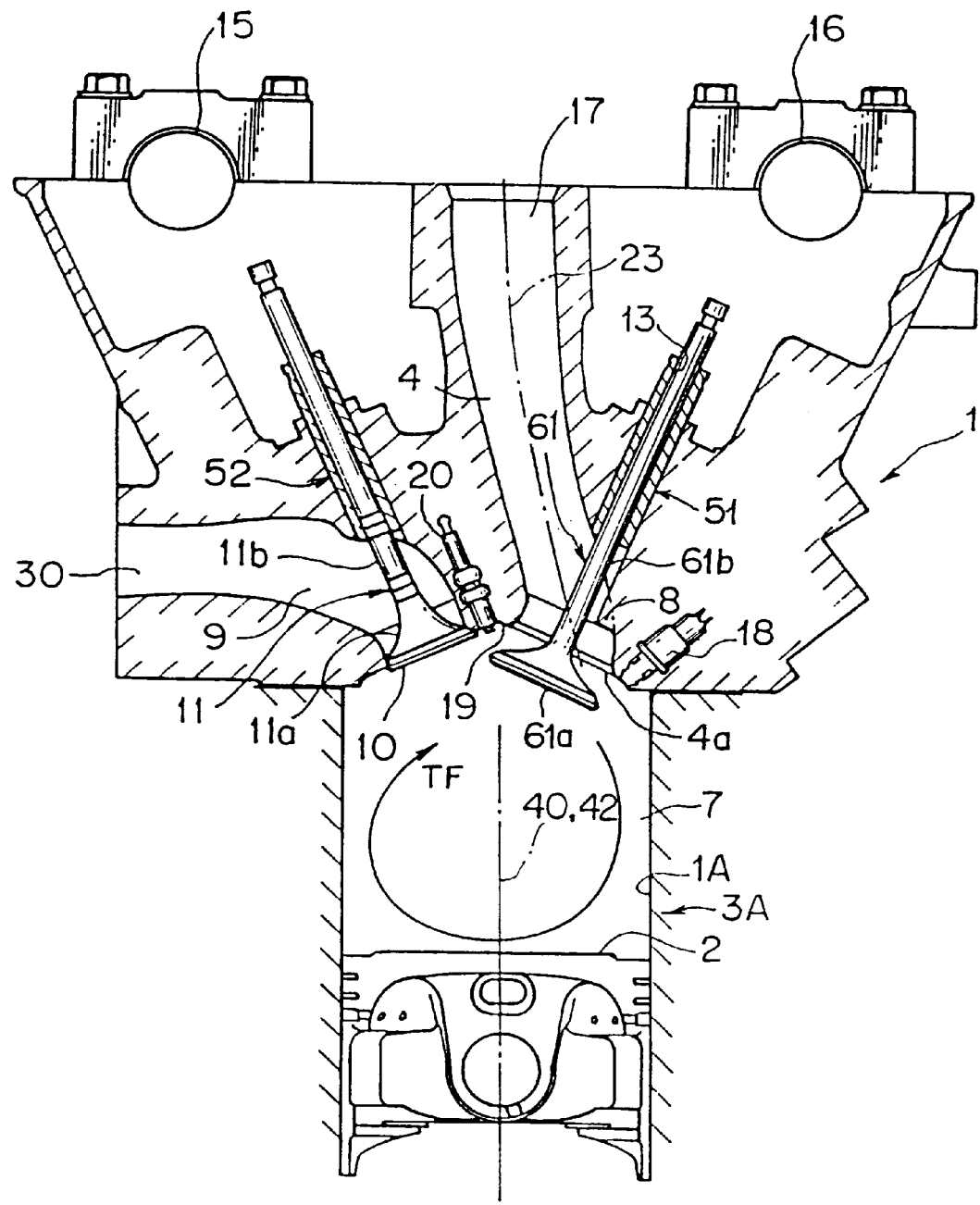
FIG. 9 is a schematic cross-sectional view showing a structure in an intake system construction according to a second embodiment of the present invention for the internal combustion engine.
Figure 10:
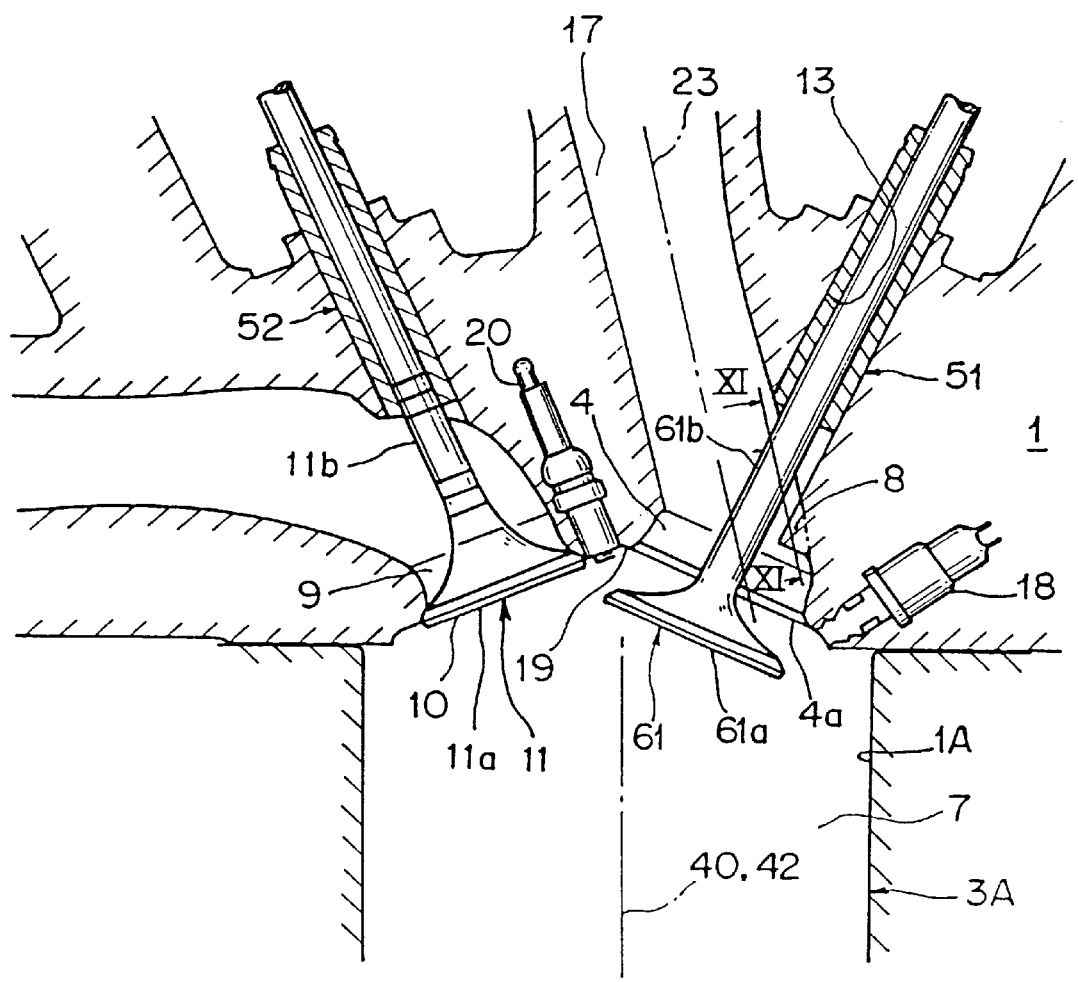
FIG. 10 is a schematic cross-sectional view illustrating an essential structure in the intake system construction according to the second embodiment of the present invention for the internal combustion engine.

A cylinder head according to the second embodiment for the internal combustion engine is constructed as a cylinder head for a 4-valve internal combustion engine whose cylinders are each provided with two intake valves and two exhaust valves. In FIGS. 9 and 10, there are shown the cylinder head 1, a piston 2, a cylinder 3A, an intake port 4, a combustion chamber 7, an exhaust port 9, an exhaust valve 11, an intake passage 17, an injector 18 and a spark plug 20.

The combustion chamber 7 is formed between a top wall of the piston 2, which has been fittedly inserted in the cylinder 3A, and a lower wall of the cylinder head 1. The intake port 4 is formed in the cylinder head 1 so that the intake port 4 opens to the combustion chamber 7. Further, the intake port 4 is arranged on one side of the reference plane 40 containing therein a central axis 42 of the cylinder 3A (i.e., on a right-hand side in FIGS. 9 and 10) and extends along a central axis 42 of the cylinder.

Owing to this arrangement, an area between the intake port 4 and a wall of the cylinder 3A (the right-hand wall in FIG. 9) is left unoccupied so that a sufficient space can be retained for mounting the injector 18 for the injection of fuel. An optimal layout can therefore be easily designed not only for the injector 18 but also for the spark plug 20.

Further, the cylinder head 1 is provided with two intake valves 61 (only one of these valves is illustrated in FIGS. 9 and 10). A head portion (valve element) 61a of the intake valve 61 is arranged so that the head portion 61a can be placed in an open end 4a of the intake port 4 opening to the combustion chamber. A stem portion 61b which extends out from the head portion 61a is arranged extending toward an upstream side of the intake port 4.

The stem portion 61b of the intake valve 61 is inserted in a valve stem guide 51 press-fitted in the cylinder head 1. Upon transmission of power from a camshaft 16, the intake valve 61 moves upwardly in a direction perpendicular to a plane which contains the head portion 61a, so that the open end 4a of the intake port 4 is opened to guide an inducted air flow from the intake passage 17 into the combustion chamber 7.

In other words, the stem portion 61b of the intake valve 61 is arranged so that a plane containing the open end 4A of the intake port is downwardly inclined toward the inner wall 1A of the cylinder (i.e., the stem portion 61b is inclined rightwards in a downward direction as viewed in FIGS. 9 and 10). Accordingly, an axis of an inducted air flow which is advancing in the intake port 4 is off-centered toward one side (a right side) of a central axis 23 of the intake port.

This has made it possible to form a strong tumble flow TF in the combustion chamber 7.

Upon manufacture of the intake valve 61, the stem portion 61b is cut to present a smooth surface.

Designated at numeral 19 is a pentroof formed on an upper wall of the combustion chamber 7. This pentroof 19 is provided with two inclined surfaces. One of the inclined surfaces can guide an inducted air flow downwardly along the inner wall 1A of the cylinder (cylinder bore), said inner wall 1A being located on an extension of the intake passage 17, whereas the other inclined surface is arranged on a side of the below-described exhaust ports so that the inducted air flow, which has been reversed in direction by the top wall of the piston and has then advanced upwards along the inner wall 1A of the cylinder, can be smoothly reversed in direction. The intake air flow from the intake passage 17 therefore advances in the direction of the tumble flow as indicated by an arrow TF while also being assisted by the guidance of the pentroof 19.

The injector 18 is arranged on an upstream side of the tumble flow TF and at a central part of the cylinder 3A as viewed in the direction of arrangement of an unillustrated crankshaft. This has made it possible to form the tumble flow TF in the combustion chamber 7 as a stratified tumble flow having a high fuel concentration at a central part thereof.

An area around a center of a top portion of the cylinder 3A is located on a side of a downstream of the tumble flow TF as illustrated in FIG. 9. The spark plug 20 is arranged on the side of such a downstream of the tumble flow TF, and at a position on the central axis 42 of the cylinder 3A and between the intake valve 61 and the exhaust valve 11. This has made it possible to feed an air-fuel mixture of a concentration close to a stoichiometric air/fuel ratio to the spark plug 20 and its vicinity area and also to form a lean air-fuel mixture of a low fuel concentration in outer portions of the tumble flow, said outer portions being remote from the spark plug 20, so that reliable combustion performance can be obtained despite feeding of fuel in a smaller quantity as a whole.

Needless to say, subsequent to a collapse of the tumble flow TF, mixing is promoted by combustion. Feeding of fuel in a predetermined quantity therefore makes it possible to achieve a stoichiometric air/fuel ratio throughout the combustion chamber 7 and hence to obtain a large output.

It is thus possible to assure sufficient ignition performance even with fuel injected in a relatively small quantity, for example, by promoting combustion based on a disturbance subsequent to a collapse of the tumble flow TF when running at a high speed but, when running at a low speed, by delaying the injection of fuel until formation of a compact combustion chamber 7 in a compression stroke and then injecting fuel into the thus-formed compact combustion chamber 7 to feed a rich (which is close to a stoichiometric air/fuel ratio) portion of an air-fuel mixture to the spark plug 20 and its vicinity area by a stratified tumble flow.

Because the injector 18 can be positioned on an outer side of the intake port 4, it is rather easier to achieve improvements in the cooling performance for the injector 18 and fuel, thereby facilitating the retention of the durability of the injector 18 and the protection of the injector 18 from heat damages.

Incidentally, designated at numeral 8 is a convex portion as a straightening member. This convex portion 8 is arranged in the intake port 4 at a location more downstream than the stem portion 61b as viewed in the direction of an inducted air flow, and serves to straighten the inducted air flow in the vicinity of the stem portion 61b. The convex portion 8 is arranged extending from an inner wall of the intake port 4 toward a downstream side of the stem portion 61b as viewed in the direction of the inducted air flow.

Figure 11:
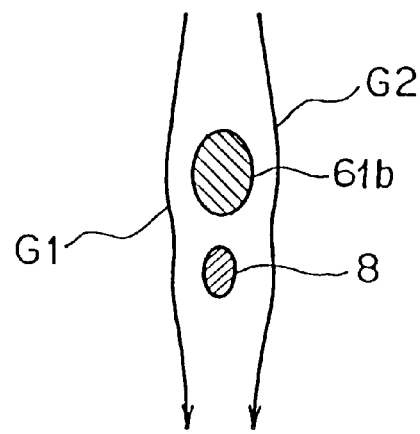
FIG. 11 is a schematic fragmentary cross-sectional view depicting an essential structure in the intake system construction according to the second embodiment of the present invention for the internal combustion engine, taken in the direction of arrows XI—XI of FIG. 10.
Figure 12A:
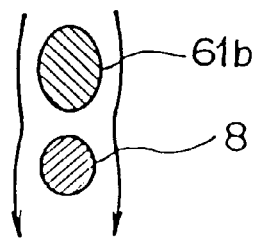
FIGS. 12A through 12D are schematic fragmentary cross-sectional views showing modifications of the intake system construction according to the second embodiment of the present invention for the internal combustion engine, each of which corresponds to the cross-sectional view taken in the direction of arrows XI—XI of FIG. 10.
Figure 12B:
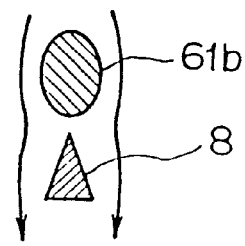
Figure 12C:
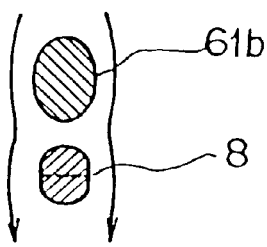
Figure 12D:
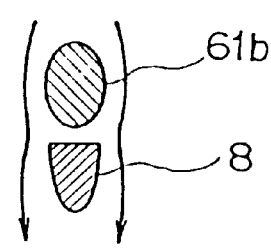

FIG. 11 is a cross-sectional view taken in the direction of arrows XI—XI of FIG. 10, that is, a cross-sectional view taken along an inducted air flow in the intake port 4. In a direction from an upstream side toward a downstream side, the stem portion 61b and the convex portion 8 are arranged in this order. As is illustrated especially in FIG. 11, the convex portion 8 is disposed on a side downstream the stem portion 61b as viewed in the direction of the inducted air flow with a predetermined interval left therebetween.

The distance between the convex portion 8 and the stem portion 61b and the cross-sectional shape of the convex portion 8 should be chosen based on hydrodynamic characteristics, such as the flow velocity of the inducted air flow, so that the straightening of the inducted air flow on the side downstream the stem portion 61b can be optimized.

The inducted air flow, which has flowed from the upstream side, is therefore effectively straightened as indicated by symbols G1,G2, whereby the convex portion 8 guides the inducted air flow to the combustion chamber 7 while preventing occurrence of vortices behind the stem portion 61b and also avoiding a reduction in the flow velocity behind the stem portion 61b.

Like the intake valve 61 described above, the exhaust valve 11 is arranged with a head portion 11a placed in an opening 10, through which the exhaust port 9 opens to the combustion chamber, and with a stem portion 11b extending from the head portion 11a and directed toward a camshaft 15.

Namely, the stem portion 11b of the exhaust valve 11 is inserted in a valve stem guide 52 press-fitted in the cylinder head 1 and is connected to the cam shaft 15. Owing to this arrangement, transmission of power from the cam shaft 15 causes the exhaust valve 11 to move toward the combustion chamber 7 in a direction of an axis of the stem portion 11b, whereby the opening 10 of the exhaust port 9 is opened to guide a flow of combustion gas from the combustion chamber 7 into an exhaust passage 30.

Since the intake system construction as the second embodiment of this invention for the internal combustion engine is formed as described above, power is transmitted from the camshaft 6 to the intake valve 61 in the internal combustion engine shown in FIGS. 9 and 11 so that the intake valve 61 moves in a direction perpendicular to a plane in which the head portion 61a is contained. As a consequence, the open end 4a of the intake port 4 is opened to guide an inducted air flow from the intake passage 17 to the combustion chamber 7.

In particular, the stem portion 61b of the intake valve 61 is arranged so that a plane including an open end 4a of the intake port 4 to the combustion chamber 7 is downwardly inclined toward an inner wall 1A of the cylinder (i.e., rightwards in a lower direction as viewed in FIGS. 9 and 10) to off-center a central axis of an inducted air flow, which is advancing in the intake port 4, from the central axis 23 of the intake port to one side (the right-hand side). A stronger tumble flow TF can therefore be formed in the combustion chamber 7.

The arrangement of the convex portion 8 on the side downstream the stem portion 61b in the intake port 4 can bring about advantages such as those to be described below.

A portion of an inducted air flow, which is passing though the intake port 4, strikes the stem portion 61b. The inducted air flow is however straightened by the convex portion 8, whereby the inducted air flow is allowed to advance past the stem portion 61b and the convex portion 8 without being disturbed and is smoothly guided into the combustion chamber 7.

The inducted air flow which has been guided into the combustion chamber 7 can then form a tumble flow as indicated by arrow TF under an assistance by the pentroof 19.

According to the intake system construction of the second aspect of the present invention for the internal combustion engine, the convex portion 8 is arranged on the downstream side of the stem portion 61b in the intake port to straighten an inducted air flow in the vicinity of the stem portion 61b. This has made it possible to suppress occurrence of disturbance in a flow behind the stem portion when the inducted air flow passes near the stem portion 61b inside the intake port 4. A loss of the flow can be reduced. It is therefore possible to form a strong tumble flow TF in the combustion chamber 7 and injection of fuel in a compression stroke can perform a lean operation more surely while making use of the tumble flow TF. Subsequent to a collapse of the tumble flow TF, a stronger disturbance can be developed. Positive use of this post-collapse disturbance can ensure atomization and mixing of fuel, thereby promoting combustion. This has the advantage that a stoichiometric operation can be performed more surely, for example, by fuel injection in an intake stroke.

It is possible to effectively straighten an inducted air flow behind the stem portion 61b by arranging the convex portion 8 as a straightening member so that the convex portion 8 extends from the inner wall of the intake port 4 toward the downstream side of the stem portion 61b and is located on the downstream side of the stem portion 61b at a predetermined interval from the stem portion. The second embodiment can therefore obtain similar advantages as the above-described first embodiment and modification thereof.

Further, the intake port 4 is arranged extending in a direction such that the intake port extends along the central axis 42 of the cylinder on one side of the reference plane in which the central axis 42 of the cylinder 3A is contained (i.e., on the right-hand side as viewed in FIGS. 9 and 10). For the arrangement of the injector 18, a sufficient space can therefore be retained between the open end 4a of the intake port 4 to the combustion chamber and an upper part of the inner wall 1A of the cylinder. An optimal layout can therefore be achieved not only for the injector 18 but also for the spark plug 20.

Figure 13:
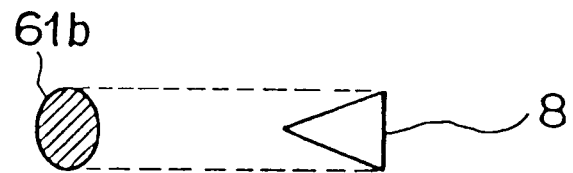
FIG. 13 is a schematic fragmentary side view of a still further modification of the intake system construction according to the second embodiment of the present invention for the internal combustion engine, which illustrates a convex portion.
Figure 14:
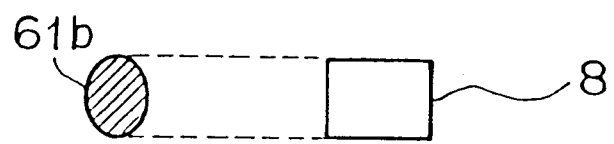
FIG. 14 is a schematic fragmentary side view of a still further modification of the intake system construction according to the second embodiment of the present invention for the internal combustion engine, which illustrates another convex portion.

In the above-described second embodiment, the convex portion 8 as viewed in the cross-section taken in the direction of arrows XI—XI of FIG. 10 has the cross-sectional shape illustrated in FIG. 11 but is not limited thereto. For example, it may have cross-sectional shapes as shown in FIGS. 12A through 12D. Where the convex portion 8 has a cross-sectional shape such as that shown in FIG. 12A, the convex portion 8 may be constructed in a conical shape as depicted in FIG. 13 or in a cylindrical shape as illustrated in FIG. 14.

Figure 15:
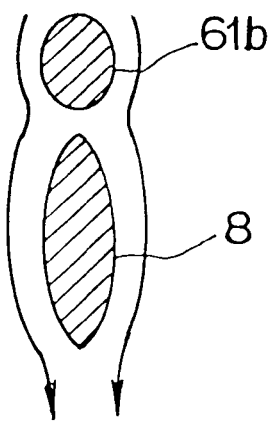
FIG. 15 is a schematic fragmentary cross-sectional view showing a still further modification of the intake system construction according to the second embodiment of the present invention for the internal combustion engine, which corresponds to FIG. 11.

Further, FIG. 15 illustrates a still further modification of the convex portion 8 and corresponds to the cross-sectional view taken in the direction of arrows XI—XI of FIG. 10. As is shown in FIG. 15, the convex portion 8 according to this modification is formed in the shape of a streamline as viewed in the direction of an inducted air flow. It is therefore possible to bring about the advantage that in addition to the straightening of the inducted air flow behind the stem portion 61b, the flow velocity of the inducted air flow can be improved on the downstream side of the convex portion 8.

Figure 16:
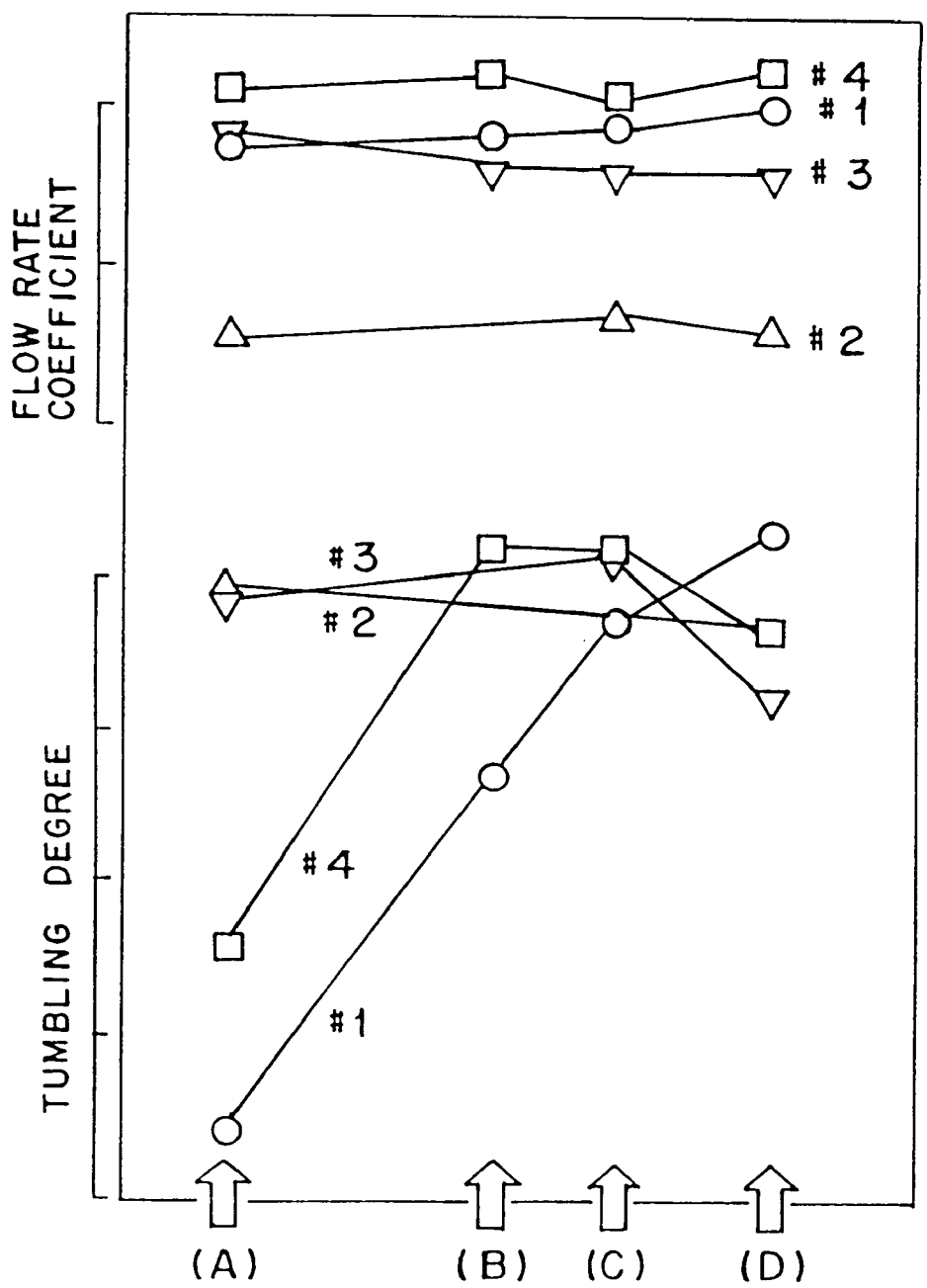
FIG. 16 is a diagram for explaining improving effects for a tumbling degree by the intake system construction according to the second embodiment of the present invention for the internal combustion engine.

With reference to FIG. 16, a description will next be made about effects which are available from the provision of the convex portion 8 for the improvement of a tumbling degree. FIG. 16 illustrates the results of a test when the present invention was applied to a in-series 4-cylinder engine. In FIG. 16, (A) indicates characteristics of an average tumbling degree and an average flow rate coefficient when the convex portion 8 was not arranged, whereas (B) to (D) indicate test results on the average tumbling degree and the average flow rate coefficient when the convex portion 8 was arranged at varied distances (B>C>D) between the convex portion 8 and the stem portion 61*b* of the intake valve 61.

Upon casting the cylinder head 1, variations generally occur in the shape of the passage of the intake port 4 due to mismatching or the like of a core which is employed for the formation of the intake port 4. The above-described intake port 4 is designed to give an appropriate average tumbling degree so that a strong vertical swirl can be formed in the combustion chamber 7 while assuring a predetermined flow rate for inducted air. For causes such as the above-mentioned mismatching of the core, variations may arise in average tumbling degree among individual cylinders.

The term "average tumbling degree" as used herein means the number (n) of revolutions of an eddy swirling in the cylinder 3A in an intake stroke (from a top dead center to a bottom dead center), while the term "average flow rate coefficient" as used herein means the ratio of a flow rate ($Q_t$) of inducted air through a space between the head portion 61*a* of the intake valve 61 and the open end 4*a* of the intake port opening to the combustion chamber (strictly speaking, a valve seat) to a flow rate ($Q_o$) of inducted air without the intake valve 61 as calculated from a cross-sectional area of a passage at a throat portion under the assumption that the loss of its flow is zero. They are expressed by the following formulas, respectively:

Average tumbling degree=the number (n) of revolutions of an eddy per intake stroke.

Average flow rate coefficient=flow rate ($Q_t$)/flow rate ($Q_o$)

For example, in the case of a 4-cylinder engine such as that indicated by (A) in FIG. 16, the average tumbling degree is reduced in the first cylinder (#1) and the fourth cylinder (#4).

By providing each intake port 4 of the engine with the convex portion 8, the average tumbling degree can be improved without reducing the average flow rate coefficient as indicated by (B) to (D) in FIG. 16. It is to be noted that the interval between an upstream end of the convex portion 8 and the stem portion 61*b* can be set as desired.

Even when there are variations in shape among the intake ports 4 or when variations occur in average tumbling ratio among the cylinders or the average tumbling degree in each cylinder does not reach a preset average tumbling degree in general due to insufficient configurational optimization of the intake ports 4 for the achievement of a high average tumbling degree, the arrangement of these convex portions 8 makes it possible to minimize the adverse effects of such variations and also to increase the average tumbling degree. Such convex portions 8 therefore can assure a high average tumbling degree so that, even when lean burn is performed, stable combustion can be obtained and a good gas mileage can be achieved.

(c) Description of the Third Embodiment

Figure 17:
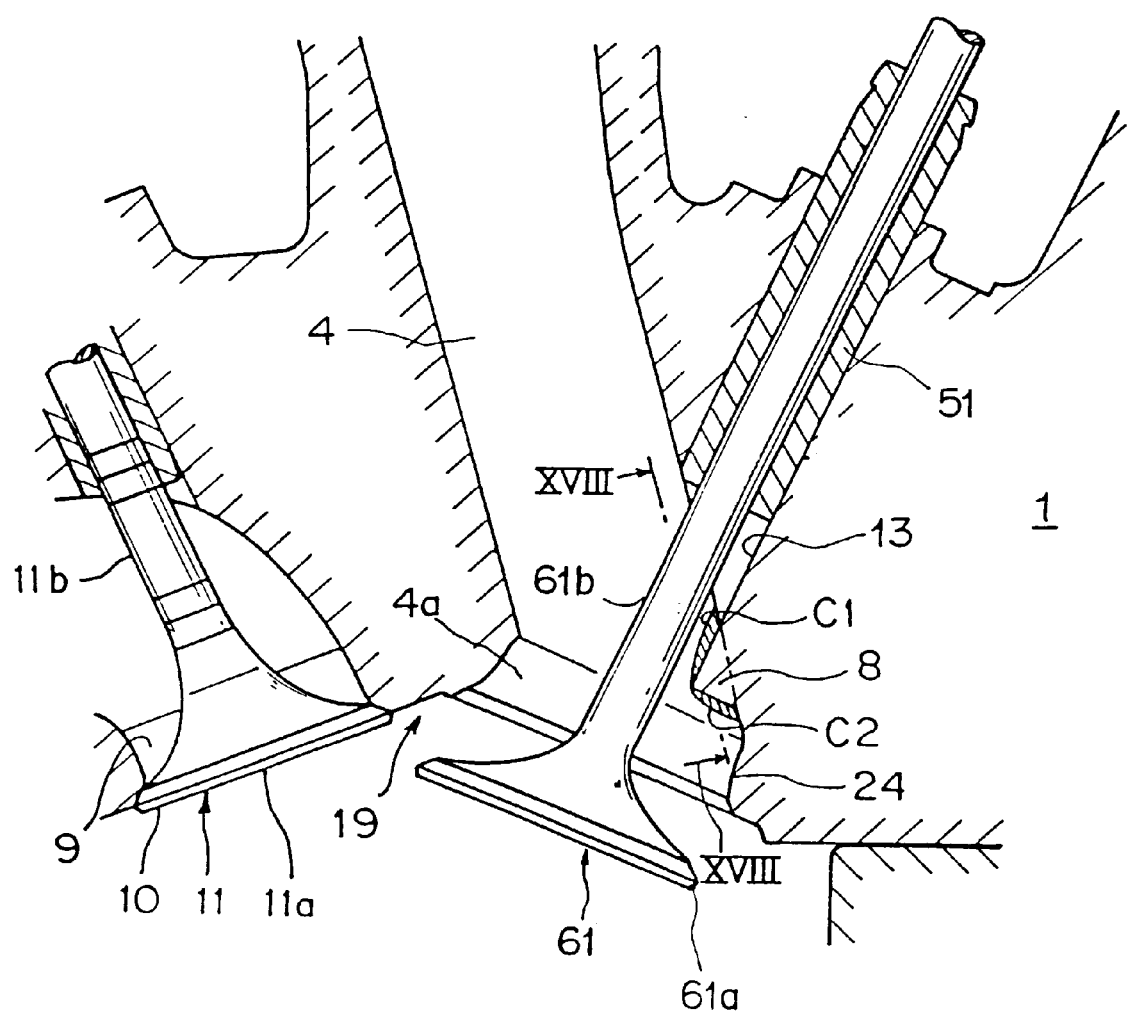
FIG. 17 is a schematic fragmentary cross-sectional view of an intake part of an internal combustion engine for explaining a process according to a third embodiment of the present invention for the manufacture of an intake passage section of the internal combustion engine.
Figure 18:
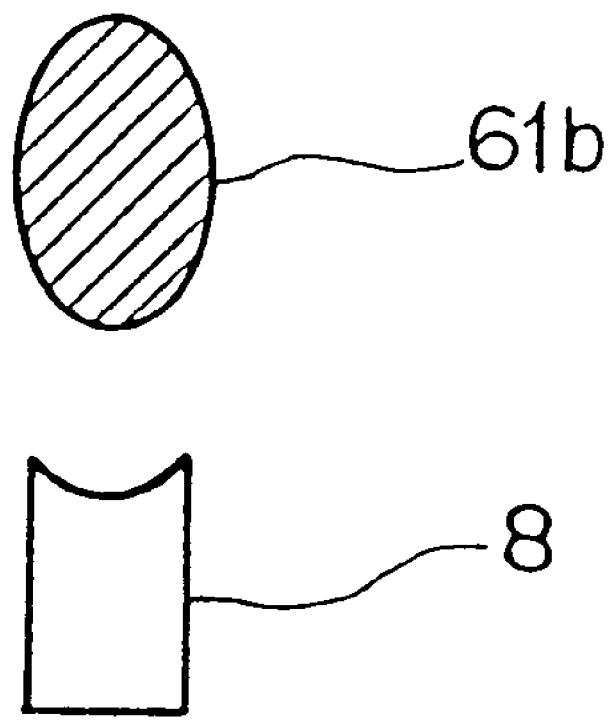
FIG. 18 is a schematic fragmentary cross-sectional view for explaining the process according to the third embodiment of the present invention for the manufacture of the intake passage section of the internal combustion engine, taken in the direction of arrows XVIII—XVIII of FIG. 17.

With reference to FIGS. 17 and 18, a description will next be made of the process according to the third embodiment of the present invention for the manufacture of the intake passage section in the internal combustion engine.

Designated at numeral 24 in FIG. 17 is a valve seat. The remaining reference numerals indicate like elements of structure in the above-described first and second embodiments (see FIGS. 1 and 2).

To manufacture the intake passage section of the internal combustion engine, a bulged portion is formed integrally with an intake port 4 upon casting a cylinder head 1 so that the bulged portion bulges out from an inner wall of the intake port on a side downstream a stem portion 61*b* of an intake vale 61 in the intake port 4. Next, upon boring a valve stem guide hole 13 for the insertion of a valve stem guide 51 in the cylinder head 1, an upstream-side surface C1 of the bulged portion is cut at the same time. Further, upon cutting the valve seat 24 at which a head portion 61*a* of the intake valve 61 is brought into contact with the cylinder head 1, a downstream-side face C2 of the bulged portion is cut concurrently therewith. As a result, the bulged portion is formed into a convex portion 8 as a straightening member and the intake passage section of the internal combustion engine is manufactured.

The valve stem guide hole 13 is formed larger by a predetermined value than an outer diameter of the stem portion 61*b* so that the valve stem guide 51 can be inserted therein. Further, the convex portion 8 is arranged on a side downstream the stem portion 61*b* inserted in the valve stem guide 51 as viewed in the direction of an inducted air flow with a predetermined interval left from the stem portion 61*b*.

The convex portion 8 is formed into the shape shown in FIG. 18 as viewed in the cross-section taken in the direction of arrows XVIII—XVIII of FIG. 17 by cutting the upstream-side surface C1 and downstream-side surface C2 of the convex portion 8. Namely, as is illustrated in FIG. 18, the upstream-side surface C1 of the convex portion 8 is formed by linearly cutting off an upstream-side arc portion along an axis of the stem portion 61*b* upon boring the valve stem guide hole 13 while the downstream-side surface C2 of the convex portion 8 is formed by linearly cutting off a downstream-side arc portion upon cutting the valve seat 24.

As a result, the upstream-side surface C1 of the convex portion 8 has a shape recessed in the form of an arc in conformity with an inner diameter of the valve stem guide hole 13, whereas the downstream-side surface C2 has a flat shape so that the downstream-side surface is contained in the same plane as a plane in which the valve seat 24 is contained.

As has been described above, according to the process of the third embodiment of this invention for the manufacture of the intake passage section of the internal combustion engine, the intake passage section of the internal combustion engine can be manufactured through the simple steps that the convex portion 8 is integrally formed upon casting, the upstream-side surface C1 of the convex portion 8 is cut concurrently with the boring of the valve stem guide hole 13, and the downstream-side surface C2 of the convex portion 8 as a straightening member is cut at the same time as the cutting of the valve seat 24. The process therefore has the advantage that the manufacturing cost can be reduced.

The intake passage section of the internal combustion engine manufactured as described above can obviously obtain effects similar to those available in the case of the above-described second embodiment.

Further, the above-described cutting of the upstream-side surface C1 and the downstream-side surface C2 of the convex portion 8 can be conducted in an order chosen as desired.

Cutting of the upstream-side surface C1 in unison with the cutting of the valve seat 24 can reduce the manufacturing cost further.

It is to be noted that the shape of each convex portion 8 in the present invention is not limited to those described above in connection with the respective embodiments and other shapes capable of exhibiting straightening action may be selected. Needless to say, the selection of such other shapes can bring about the same advantages as the above-described respective embodiments.

Application of the technical feature of the present invention that the convex portion 8 is arranged is not limited to internal combustion engines in which tumble flows TF are formed. Its application to various internal combustion engines of other types can bring about at least the effect that the efficiency of induction can be improved owing to the straightening of an inducted air flow.

Of course, the number of intake valves in each cylinder is not limited to their number in the respective embodiments and cylinders of 1 valve, 3 valves or the like can be contemplated.

According to the first and second embodiments, each valve stem guide is prevented from extending into the intake port and only the stem portion of the intake valve exists in the intake port. An inducted air flow is blocked by a smaller area in the intake port, thereby making it possible to reduce induction resistance and a disturbance to the inducted air flow.

(d) Description of the Fourth Embodiment

The intake system structure according to the fourth embodiment of the present invention for the internal combustion engine will be described next with reference to FIG. 19.

Elements of structure similar to those in the above-described first to third embodiments will be designated by like reference numerals in the subsequent description, and their detailed description are omitted herein.

Figure 19:
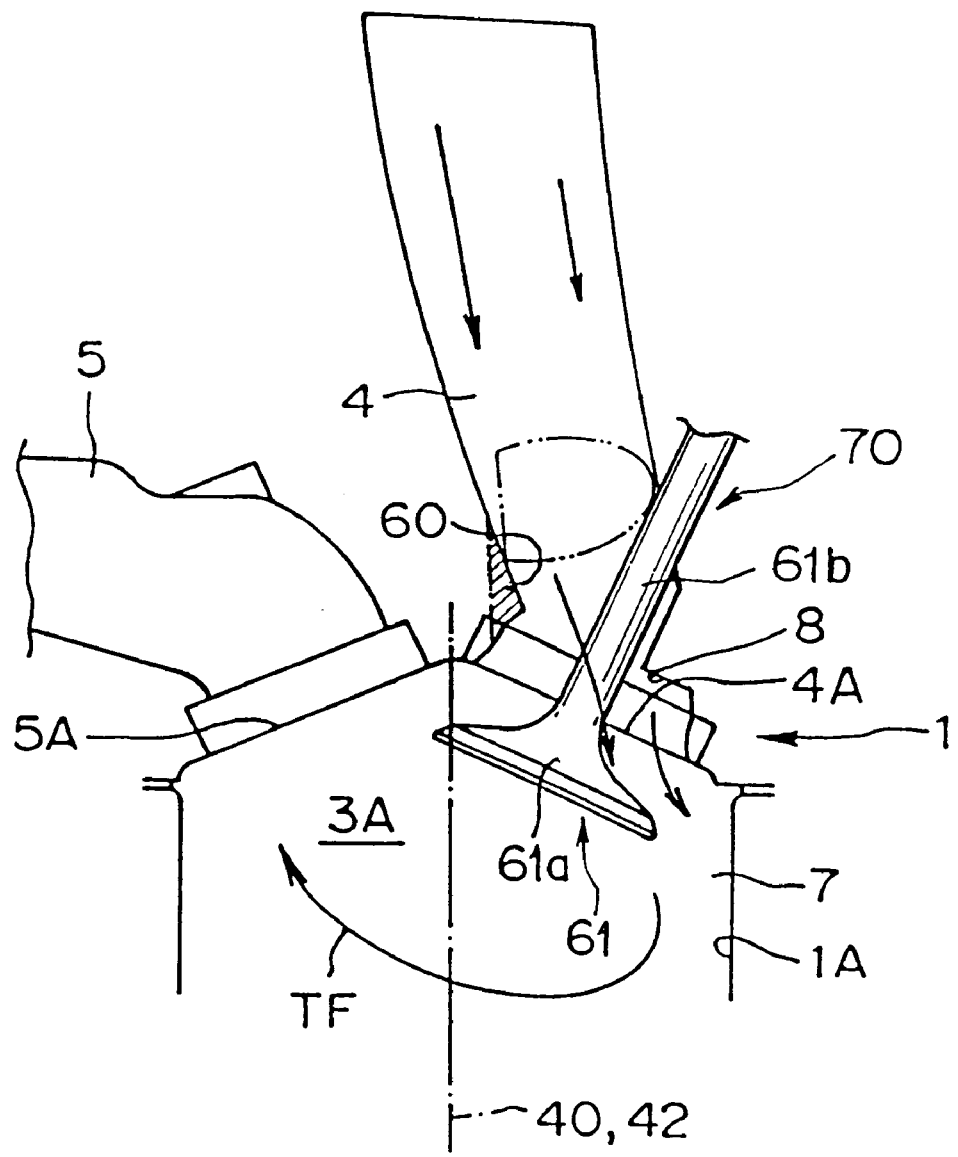
FIG. 19 is a schematic cross-sectional view showing an overall structure of an intake system construction according to a fourth embodiment of the present invention for an internal combustion engine.
Figure 20:
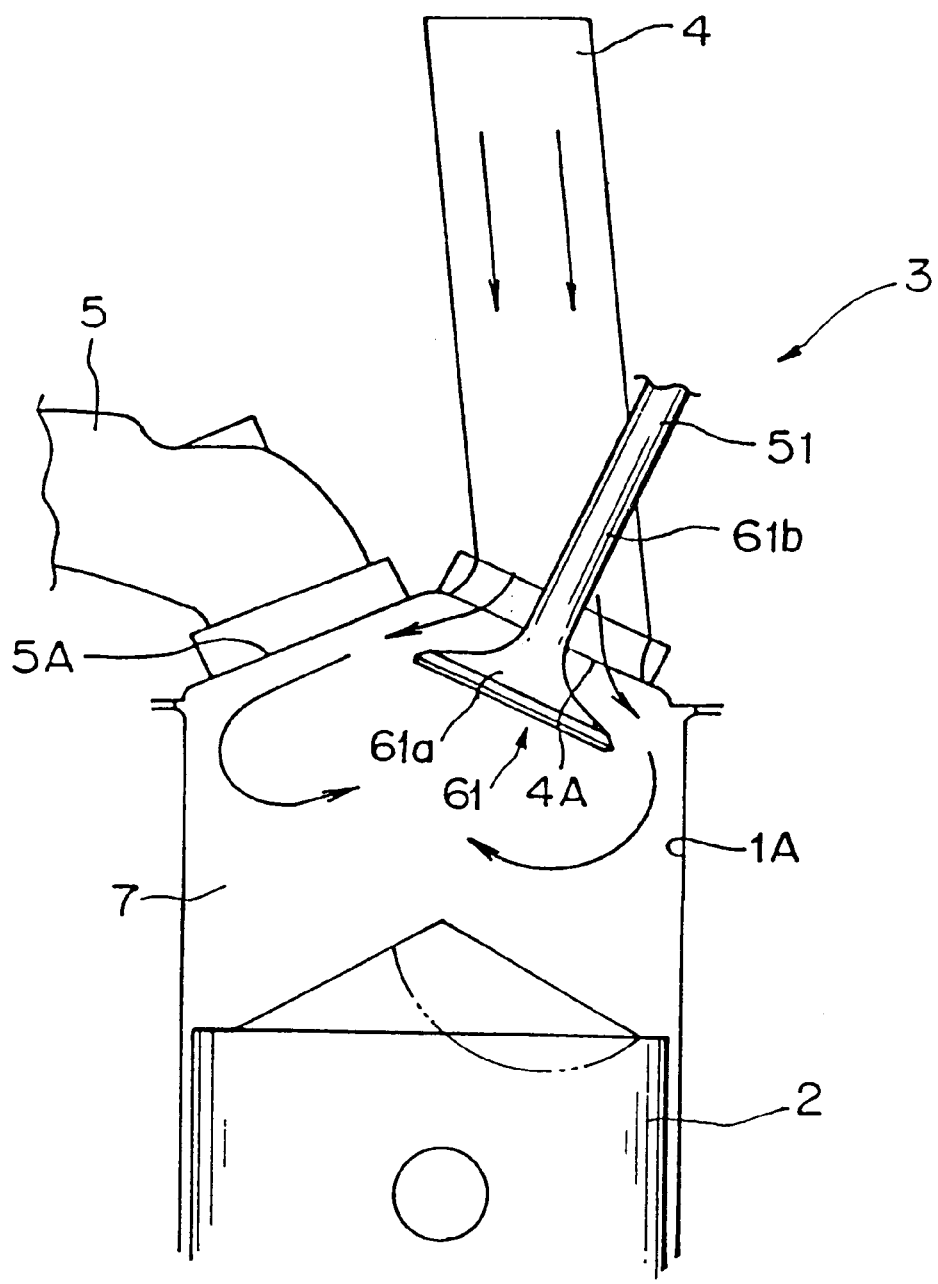
FIG. 20 is a schematic view illustrating an incylinder injection internal combustion engine.

Describing the fourth embodiment, the engine is provided, as shown in FIG. 19, with a guide portion (raised portion) 60 for guiding an inducted air flow from an intake port 4 into a combustion chamber 7, specifically toward an inner peripheral surface of a side wall of a cylinder 3A and also with an inducted-air-flow correcting portion 70 for reducing induction resistance to the inducted air flow, which is introduced from the intake port 4 into the combustion chamber 7, so that a vertical swirl can be formed with an increased tumbling degree in the combustion chamber 7.

Here, the inducted-air-flow correcting portion 70 is constructed of the intake port 4, which is widened in a half thereof on a side of a reference plane 40, and a straightening member (convex portion) 8 arranged on a side downstream a stem portion 61b of an intake valve 61.

Namely, as is illustrated in FIG. 19, the combustion chamber 7 is formed by a cylinder head 1 and a piston (not shown) fittedly inserted in a cylinder 3A. The reference plane 40 is an imaginary plane which contains a central axis 42 of the cylinder 3A and a central axis of an unillustrated crankshaft. Two intake ports 4 are disposed on one side of this reference plane 40, and two exhaust ports 5 are arranged on the other side of the reference plane 40.

Further, each intake port 4 is arranged extending substantially upright from the cylinder head 1. An open end 4A of each intake port 4 is disposed somewhat inclined relative to a mounting face of the cylinder head 1. An intake-vale-side top wall of the combustion chamber 7 of the engine is therefore configured in the form of a pentroof.

A spark plug (not illustrated) is arranged at or around a center of a top portion of the combustion chamber 7. An injection (not shown) for feeding fuel into the combustion chamber 7 is arranged in the cylinder head 1 on a side of the intake port 4.

As is shown in FIG. 19, each intake port 4 is formed so that it has a substantially semicircular cross-sectional shape in a part thereof, and is hence formed as in the first embodiment. Described specifically, the intake port 4 is configured so that like the cross-sectional shapes shown in FIGS. 4A through 4I, its cross-sectional shape is other than a substantially semicircular cross-sectional shape on an upstream side and becomes closer to a substantially semicircular cross-sectional shape as the point of the cross-section moves toward the downstream end of the intake port 4. Further, as is illustrated in FIGS. 4A through 4I, the intake port 4 is configured so that the individual cross-sectional shapes smoothly change to avoid any substantial interference with a flow of inducted air.

In the vicinity of the open end 4A of the intake port 4, the intake port 4 is configured to have a substantially semicircular shape. This semicircular shape is formed so that the half on the side of the reference plane is wider than the other half. Specifically, the intake port 4 is formed so that a straight portion (i.e., the widened portion) of the semicircular cross-section is located on the side of a central axis 42 of the cylinder 3A and an arc-shaped portion of the semicircular cross-section is located on the side of the side wall of the cylinder 3A.

Further, as is depicted in FIG. 19, the intake port 4 is provided, in the half thereof on the side of the reference plane 40 and in the vicinity of the open end 4A of the intake port 4, with the raised portion 60 as a guide portion for smoothly guiding an inducted air flow, which has flowed through the intake port 4, from the open end 4A toward the inner wall 1A of the cylinder. The raised portion 60 is formed as a jumping hill somewhat warped toward the central axis 42 of the cylinder as viewed in a direction so that the reference plane 40 and the central axis 42 of the cylinder over-lap each other and look as a single line (namely, in the state of FIG. 19), so that the inducted air flow is caused to concentrate in a direction away from the central axis 42 of the cylinder in the intake port 4.

As far as the above-described features are concerned, the fourth embodiment is of the same construction as the first embodiment.

This intake port 4 is also provided with a convex portion 8 as a straightening member as in the second embodiment. This convex portion 8 is arranged in the intake port 4 on a side downstream the stem portion 61b of the intake valve 61 as viewed in the direction of an inducted air flow so that the inducted air flow is straightened in the vicinity of the stem portion 61b. The convex portion 8 is arranged extending from the inner wall of the intake port 4 toward a downstream side of the stem portion 61b as viewed in the direction of the inducted air flow.

Further, the convex portion 8 is arranged on a side downstream the stem portion 61b as viewed in the direction of the inducted air flow with a predetermined interval left therebetween. The distance between the convex portion 8 and the stem portion 61b and the cross-sectional shape of the convex portion 8 should be chosen based on hydrodynamic characteristics, such as the flow velocity of the inducted air flow, so that the straightening of the inducted air flow on the side downstream the stem portion 61b can be optimized.

In this fourth embodiment, the inducted-air-flow correcting portion 70 is constructed of the intake port 4, which is widened in the half thereof on the side of the reference plane 40, and the straightening member (convex portion) 8 arranged on the side downstream the stem portion 61b of the intake valve 61. Under the action of this inducted-air-flow correcting portion 70, the induction resistance to an inducted air flow which flows in the intake port 4 and is introduced into the combustion chamber 7 is reduced so that a vertical swirl is formed with an increased tumbling degree in the combustion chamber 7.

Described specifically, the intake port 4 is arranged substantially upright so that the inducted air flow, which has flowed into the combustion chamber 7, advances downwardly (toward the piston). Further, the cross-section of the intake port 4 is formed in the vicinity of the open end 4A of the intake port 4 into the substantially semicircular shape widened on the side of the central axis 42 of the cylinder 3A as shown in FIG. 19. Near the open end 4A of the intake port 4, a majority of the inducted air flow which has passed through the intake port 4 is therefore allowed to pass through the intake port 4 on the side of the central axis 42 of the cylinder 3A (namely, through the half of the intake port 4 on the side of the reference plane 40).

Namely, in the vicinity of the open end 4A of the intake port 4, the inducted air flow is guided by the raised portion 60 and is hence off-centered in the intake port 4 from the side of the central axis 42 of the cylinder toward the inner wall 1A of the cylinder.

At this time, a portion of the inducted air flow which is passing through the intake port 4 strikes the stem portion 61b. The inducted air flow is however straightened by the convex portion 8 so that the inducted air flow is guided into the combustion chamber 7 without being disturbed by the stem portion 61b and the convex portion 8.

Since the inducted air flow advances toward the open end 4A of the intake port after it has been deflected as described above, the incident angle of the inducted air flow against the head portion 61a becomes acute so that the induction resistance at the valve head 61a is substantially reduced. As a consequence, the induction resistance by the intake valve 61 is substantially lessened, thereby allowing a strong inducted air flow to flow into the combustion chamber 7 from a side close to the inner wall 1A of the cylinder.

Owing to the construction described above, the strong inducted air flow enters the cylinder 3A through the open end 4A of the intake port 4 from the side remote from the central axis 42 of the cylinder (i.e., from the side of the inner wall 1A of the cylinder 3A). When such a strong inducted air flow enters the cylinder 3A, the tumble flow TF is enhanced. It is therefore possible to sufficiently form a tumble flow TF even in an engine equipped with combustion chambers of a large volume.

Accordingly, this fourth embodiment can bring about similar advantages as the first and second embodiments and moreover, has the advantage that a high tumbling degree can be assured while making an improvement in induction resistance.

In she fourth embodiment, the inducted-air-flow correcting portion 70 is constructed of the intake port 4, which is widened in the half thereof on the side of the reference plane 40, and the straightening member (convex portion) 8 arranged on the side downstream the stem portion 61b of the intake valve 61. The inducted-air-flow correcting portion 70 is however not limited to such a construction. For example, the intake port 4 is formed in a conventional shape, and the inducted-air-flow correcting portion 70 may be constructed by the convex portion 8 alone. Conversely, the inducted-air-flow correcting portion 70 may also be constructed only by the intake port 4 formed wider in the half thereof on the side of the reference plane 40 without arranging the convex portion 8 in the intake port 4.

The intake system constructions according to the present invention for internal combustion engines and the process according to the present invention for the manufacture of an intake passage section in an internal combustion engine have been described above using the in-cylinder injection internal combustion engines. It is however to be noted that engines to which the present invention can be applied are not limited to such in-cylinder injection internal combustion engines. The present invention can also be applied to internal combustion engines of the type that fuel is fed into intake ports, insofar as they are equipped with vertical intake ports vertically extending in cylinder heads.

What is claimed is:

1. An intake system construction for an internal combustion engine, comprising:
   a combustion chamber formed with upper and lower extremities thereof defined by a lower wall of a cylinder head and a top wall of a piston fittedly inserted in a cylinder;
   an intake open end formed in said lower wall of said cylinder head in opposition to said combustion chamber at one side of a reference plane which contains a central axis of said cylinder;
   an intake port formed in communication with said combustion chamber via said intake open end and extending upwardly from said intake open end so that a vertical swirl of inducted air is formed in said combustion chamber;
   an intake valve having a head portion for opening or closing said intake open end and a stem portion extending from said head portion to an upstream side of said intake port through said cylinder head;
   an exhaust valve for opening or closing an exhaust open end formed in said lower wall of said cylinder head in opposition to said combustion chamber on an opposite side of said reference plane;
   an exhaust port communicating with said combustion chamber via said exhaust open end so that combustion gas is discharged from said combustion chamber; and
   a straightening member arranged in said intake port on a downstream side of said stem portion which is remote from the reference plane so that an inducted air flow is straightened on said downstream side of said stem portion and flow into the combustion chamber remote from the central axis of said cylinder.

2. The intake system construction according to claim 1, wherein said intake port is arranged extending in a vertical direction so that said intake port extends substantially along said central axis of said cylinder.

3. The intake system construction according to claim 2, wherein said intake port is arranged extending substantially in said vertical direction on a side of said reference plane which contains a central axis of said cylinder.

4. The intake system construction according to claim 2, wherein said intake port is arranged extending substantially in said vertical direction and crossing said reference plane, which contains said central axis of said cylinder, from a side thereof to an opposite side thereof.

5. The intake system construction according to claim 1, wherein said straightening member is constructed as a convex portion formed so that said convexity projects from an inner wall of said intake port toward a central part of said intake port.

6. The intake system construction according to claim 5, wherein said convex portion is arranged extending toward said downstream side of said stem portion.

7. The intake system construction according to claim 1, further comprising:
   a valve stem guide for slidably and rotatably guiding said stem portion relative to said cylinder head, said valve stem guide being arranged in said cylinder head without being exposed in said intake port.

8. The intake system construction according to claim 1, wherein said internal combustion engine is an in-cylinder injection internal combustion engine with a fuel injection valve arranged so that fuel is directly injected into said combustion chamber.

9. The intake system construction according to claim 1, wherein said intake port is formed wider in one of halves thereof located adjacent said reference plane than in the other half thereof located remote from said reference plane, whereby a central axis of an inducted air flow in said intake port is off-centered toward said reference plane; and said intake port is provided at a lower extremity thereof in said one half thereof with a guide portion for guiding an inducted air flow in said intake port toward an inner peripheral surface of a side wall of said cylinder in said combustion chamber.

10. The intake system construction according to claim 9, wherein said intake port defines a passage of a cross-sectional shape that at said lower extremity of said intake port, said one half located adjacent said reference plane is formed with a cross-sectional area wider than said the other half located remote from said reference plane.

11. The intake system construction according to claim 9, wherein said intake port defines a passage of a cross-sectional shape which, at said lower extremity of said intake port, is in a substantially semicircular form having a chord on a side of said reference plane.

12. The intake system construction according to claim 9, wherein said intake port defines a passage of a cross-sectional shape which, at said lower extremity of said intake port, is in a substantially triangular form having a side on a side of said reference plane.

13. An intake system construction for an internal combustion engine, comprising:

a combustion chamber formed with upper and lower extremities thereof defined by a lower wall of a cylinder head and a top wall of a piston fittedly inserted in a cylinder;

an intake open end formed in said lower wall of said cylinder head in opposition to said combustion chamber at one side of a reference plane which contains a central axis of said cylinder;

an intake port formed in communication with said combustion chamber via said intake open end and extending upwardly from said intake open end so that a vertical swirl of inducted air formed in said combustion chamber;

an intake valve having a head portion for opening or closing said intake open end and a stem portion extending from said head portion to an upstream side of said intake port through said cylinder head; and a straightening member arranged in said intake port on a downstream side of said stem portion and which is remote from the reference plane so that an inducted air flow is straightened on said downstream side of said stem portion and flow into the combustion chamber remote from the central axis of said cylinder.

14. The intake system construction according to claim 13, wherein said straightening member is constructed as a convex portion formed so that said convexity projects from an inner wall of said intake port toward a central part of said intake port.

15. The intake system construction according to claim 14, wherein said convex portion is arranged extending toward said downstream side of said stem portion.

* * * * *